(12) United States Patent
Kemmochi et al.

(10) Patent No.: US 7,171,234 B2
(45) Date of Patent: Jan. 30, 2007

(54) HIGH-FREQUENCY SWITCH CIRCUIT

(75) Inventors: Shigeru Kemmochi, Tottori-ken (JP); Mitsuhiro Watanabe, Tottori-ken (JP); Hiroyuki Tai, Tottori-ken (JP); Tsuyoshi Taketa, Dusseldorf (DE); Toshihiko Tanaka, Saitama-ken (JP)

(73) Assignees: Marino-Forum21, Tokyo (JP); Tokyo Kyuei Co., Ltd., Tokyo (JP); Hitachi Metals, Ltd., Tokyo (JP)

( * ) Notice: Subject to any disclaimer, the term of this patent is extended or adjusted under 35 U.S.C. 154(b) by 73 days.

(21) Appl. No.: 11/090,640

(22) Filed: Mar. 28, 2005

(65) Prior Publication Data

US 2005/0221769 A1    Oct. 6, 2005

Related U.S. Application Data

(62) Division of application No. 09/700,671, filed on Jan. 29, 2001, now Pat. No. 6,987,984.

(30) Foreign Application Priority Data

Mar. 18, 1999  (JP)  ................... 11-73234

(51) Int. Cl.
    *H04M 1/00* (2006.01)
(52) U.S. Cl. .............. 455/552.1; 455/78; 455/80; 455/550.1; 455/553.1; 333/103; 333/104
(58) Field of Classification Search ........... 455/552.1, 455/550.1, 553.1, 73, 78–83; 333/100–104, 333/134, 175
    See application file for complete search history.

(56) References Cited

U.S. PATENT DOCUMENTS

| | | | | |
|---|---|---|---|---|
| 5,442,812 A | * | 8/1995 | Ishizaki et al. | 455/82 |
| 5,499,000 A | * | 3/1996 | Morikawa et al. | 333/104 |
| 5,507,011 A | * | 4/1996 | Chigodo et al. | 455/82 |
| 5,513,382 A | * | 4/1996 | Agahi-Kesheh et al. | 455/83 |
| 5,519,364 A | * | 5/1996 | Kato et al. | 333/103 |
| 5,678,199 A | * | 10/1997 | Birth et al. | 455/80 |
| 5,699,023 A | * | 12/1997 | Tanaka et al. | 333/103 |
| 5,742,212 A | * | 4/1998 | Kato et al. | 333/104 |
| 5,748,054 A | * | 5/1998 | Tonegawa et al. | 333/104 |
| 5,768,691 A | * | 6/1998 | Matero et al. | 455/78 |
| 5,778,306 A | * | 7/1998 | Kommrusch | 455/78 |
| 5,999,065 A | * | 12/1999 | Furutani et al. | 333/103 |

(Continued)

FOREIGN PATENT DOCUMENTS

EP    0820155 A2    1/1998

(Continued)

*Primary Examiner*—Matthew D. Anderson
*Assistant Examiner*—Tuan Tran
(74) *Attorney, Agent, or Firm*—Finnegan, Henderson, Farabow, Garrett & Dunner, LLP

(57) ABSTRACT

A high-frequency switch circuit is provided for switching a connection between a common transmission circuit and antenna side circuit in a plurality of transmitting and receiving systems. The high-frequency switch includes a connection between the antenna side circuit and a reception circuit in one of the plurality of transmitting and receiving systems, and a connection between the antenna side circuit and a reception circuit in the other of the plurality of transmitting and receiving systems, the high-frequency switch circuit comprising a first diode; a first distributed constant line; a second diode; a capacitor; a third diode; a second distributed constant line; and a fourth diode.

5 Claims, 17 Drawing Sheets

U.S. PATENT DOCUMENTS

| | | | |
|---|---|---|---|
| 6,006,105 A * | 12/1999 | Rostoker et al. | 455/552.1 |
| 6,060,960 A * | 5/2000 | Tanaka et al. | 333/104 |
| 6,070,059 A * | 5/2000 | Kato et al. | 455/78 |
| 6,108,527 A * | 8/2000 | Urban et al. | 455/115.3 |
| 6,442,376 B1 * | 8/2002 | Furutani et al. | 455/82 |
| 6,518,822 B1 * | 2/2003 | Kato et al. | 327/494 |
| 6,563,396 B2 * | 5/2003 | Tanaka et al. | 333/133 |
| 6,633,748 B1 * | 10/2003 | Watanabe et al. | 455/78 |
| 6,766,149 B1 * | 7/2004 | Hikita et al. | 455/83 |
| 6,788,958 B2 * | 9/2004 | Furutani et al. | 455/552.1 |

FOREIGN PATENT DOCUMENTS

| | | |
|---|---|---|
| EP | 1003291 A2 | 5/2000 |
| EP | 1014592 A2 | 6/2000 |
| EP | 0820155 A3 | 2/2001 |
| EP | 1003291 A3 | 1/2004 |
| EP | 1014592 A3 | 4/2004 |
| JP | 6-197040 | 7/1994 |
| JP | 11-103325 | 4/1999 |
| JP | 11-225088 | 8/1999 |
| JP | 11-313003 | 11/1999 |
| JP | 2000-165274 | 6/2000 |
| JP | 2000-165288 | 6/2000 |

* cited by examiner

Insertion Loss Characteristics Between TX and ANT

Isolation Characteristics Between TX1 and RX1

Insertion Loss Characteristics Between ANT and RX1

Isolation Characteristics Between ANT and TX1

Insertion Loss Characteristics Between TX2 and ANT

Isolation Characteristics Between TX2 and RX2

Isolation Characteristics Between TX2 and RX3

Insertion Loss Characteristics Between ANT and RX2

Isolation Characteristics Between ANT and TX2

Isolation Characteristics Between ANT and RX3

Insertion Loss Characteristics Between ANT and RX3

Isolation Characteristics Between ANT and TX2

Isolation Characteristics Between ANT and RX2

HIGH-FREQUENCY SWITCH CIRCUIT

This is a division of application Ser. No. 09/700,671, filed Jan. 29, 2001, now U.S. Pat. No. 6,987,984, which is incorporated herein by reference.

FIELD OF THE INVENTION

The present invention relates to a high-frequency composite device for wireless communications equipment usable in a plurality of different communication modes, particularly to a high-frequency switch circuit for wireless communications equipment adapted for a plurality of different communication modes.

BACKGROUND OF THE INVENTION

There are various systems for portable wireless communications equipment, for instance, GSM (Global System for Mobile Communications) and DCS1800 (Digital Cellular System 1800) widely used mostly in Europe, PCS (Personal Communications Services) used in the U.S., and PDC (Personal Digital Cellular) used in Japan. According to recent rapid expansion of cellular phones, however, a frequency band allocated to each system cannot allow all users to use their cellular phones in major cities in advanced countries, resulting in difficulty in connection and thus causing such a problem that cellular phones are disconnected during communication. Thus, proposal was made to permit users to utilize a plurality of systems, thereby increasing substantially usable frequency, and further to expand serviceable territories and to effectively use communications infrastructure of each system.

However, when the use of a plurality of systems is desired, a user has to carry a necessary number of portable communications equipments corresponding to each system, though there was conventionally no small, light-weight, portable communications equipment capable of communicating by a plurality of systems. What is necessary to enable a single portable communications equipment to use a plurality of systems is to provide the portable communications equipment with parts for each system. High-frequency circuit parts are needed for each system, for instance, a filter for passing a transmission signal of a desired transmission frequency, a high-frequency switch for switching a transmission circuit and a reception circuit and an antenna for emitting a transmission signal and receiving a reception signal in a transmission system; and a filter for passing a signal of a desired frequency among reception signals passing through the high-frequency switch in a reception system. This makes a portable communications equipment unsuitably expensive with increased volume and weight, and to achieve a portable communications equipment capable of using a plurality of systems, the portable communications equipment should have miniaturized, composite-functioning high-frequency circuit parts compatible with frequencies of a plurality of systems.

Accordingly, an object of the present invention is to provide a miniaturized, high-performance, high-frequency switch circuit capable of switching transmission circuits and reception circuits of a plurality of systems with high-frequency switches, as a high-frequency circuit part used in a portable communications equipment, which permits a single portable communications equipment to be compatible with a plurality of systems.

DISCLOSURE OF THE INVENTION

A high-frequency switch circuit is provided for switching a connection between a common transmission circuit and an antenna side circuit in a plurality of transmitting and receiving systems, a connection between the antenna side circuit and a reception circuit in one of the plurality of transmitting and receiving systems, and a connection between the antenna side circuit and a reception circuit in the other of the plurality of transmitting and receiving systems. The high-frequency switch circuit comprises a first diode connected between the common transmission circuit and the antenna side circuit; a first distributed constant line connected to the antenna side circuit; a second diode connected to a ground at the other side of the first distributed constant line; a capacitor connected in series to the first distributed constant line; a third diode connected between the capacitor and said reception circuit in one of the plurality of transmitting and receiving systems; a second distributed constant line connected between the capacitor and the reception circuit in the other of the plurality of transmitting and receiving systems; and a fourth diode connected to a ground at the reception circuit of the second distributed constant line.

In one embodiment of the present invention, the first distributed constant line is connected to the anode side of the first diode and the cathode side of the second diode, and a first control circuit is connected to the anode side of the second diode.

In another embodiment of the present invention, the second distributed constant line is connected to the anode side of the third diode and the cathode side of the fourth diode, and a second control circuit is connected to the anode side of the fourth diode.

In a preferred example, the first distributed constant line is connected to the anode side of the first diode and the cathode side of the second diode, the second distributed constant line is connected to the anode side of the third diode and the cathode side of the fourth diode, a first control circuit is connected to the anode side of the second diode, and a second control circuit is connected to the anode side of the fourth diode, wherein the connection between a common transmission circuit and an antenna side circuit is carried out by making the first and second diodes in an ON-state by applying voltage from a power supply of the first control circuit; the connection between the antenna side circuit and the reception circuit in one of the plurality of transmitting and receiving systems is carried out by making the first and second diodes in an OFF-state and, and making the third and fourth diodes in an ON-state by applying voltage from a power supply of the second control circuit; and the connection between the antenna side circuit and the reception circuit in the other of the plurality of transmitting and receiving systems is carried out by making the first to fourth diodes in an OFF-state, respectively.

Here, the first and second distributed constant lines are constituted by line electrodes in a laminate comprising dielectric layers having electrode patterns, and the first to fourth diodes are mounted onto the laminate.

The second invention of the present application is to provide a handy phone comprising a high-frequency switch circuit of the present invention, the high-frequency switch circuit being disposed between an antenna and transmission circuit and reception circuits.

BEST MODE FOR CARRYING OUT THE INVENTION

[1] Circuit Structure

Figure 1:
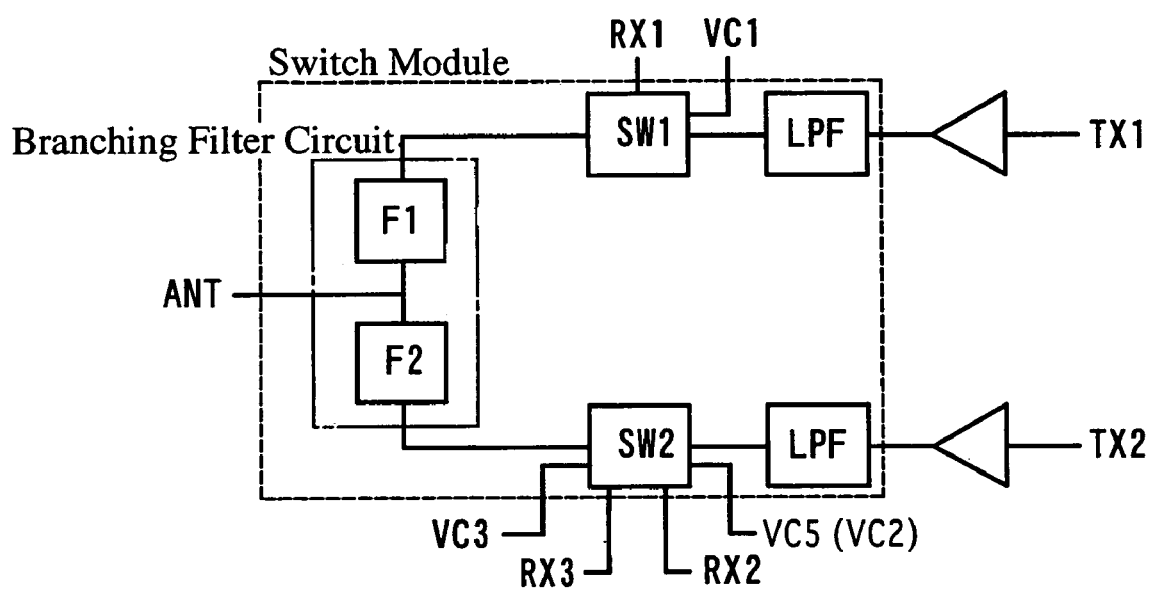
FIG. 1 is a block diagram showing a circuit of a high-frequency switch module according to one embodiment of the present invention.

FIG. 1 shows a high-frequency switch module using a high-frequency switch circuit according to one embodiment of the present invention. This high-frequency switch module functions to switch three transmitting and receiving systems, comprising (a) a branching filter circuit comprising first and second filter circuits F1, F2 for dividing a signal introduced into an antenna ANT to a reception signal for the first transmitting and receiving system and a reception signal for the second and third transmitting and receiving systems; (b) a first switch circuit SW1 disposed downstream of the first filter circuit F1 for switching a transmission circuit TX1 and a reception circuit RX1 in the first transmitting and receiving system by voltage applied from a control circuit VC1; (c) a second switch circuit SW2 disposed downstream of the second filter circuit F2 for switching a transmission circuit TX2 in the second and third transmitting and receiving systems, a reception circuit RX2 in the second transmitting and receiving system and a reception circuit RX3 in the third transmitting and receiving system by voltage applied from control circuits VC5, VC3.

Figure 9:
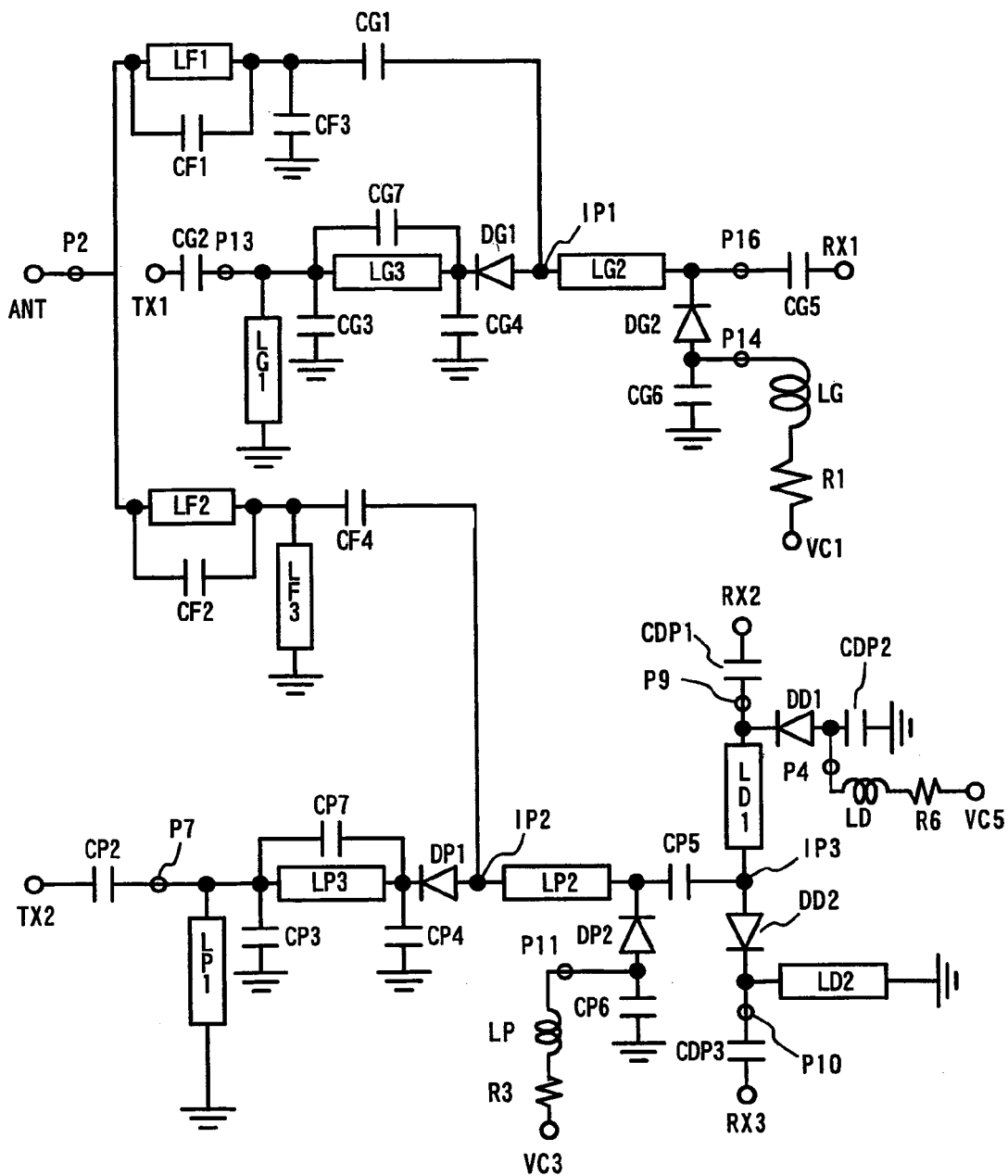
FIG. 9 is a schematic view showing one equivalent circuit of a high-frequency switch module according to an embodiment of the present invention.

In the embodiment mentioned above, the high-frequency switch circuit of the present invention is used for the second switching circuit SW2 comprising SW2-1 and SW2-2. Thus, in the second switching circuit, to have the second and third transmitting and receiving systems share a transmission circuit TX2, the high-frequency switch module is preferably constituted by an equivalent circuit as shown in FIG. 9.

Explanation will be made below, taking as an example a case where the first transmitting and receiving system is GSM (transmission frequency: 880–915 MHz, reception frequency: 925–960 MHz), the second transmitting and receiving system is DCS1800 (transmission frequency: 1710–1785 MHz, reception frequency: 1805–1880 MHz), and the third transmitting and receiving system is PCS (transmission frequency: 1850–1910 MHz, reception frequency: 1930–1990 MHz).

(A) First and Second Filter Circuits

Each of the first and second filter circuits F1, F2 connected to an antenna ANT is constituted by a distributed constant line and a capacitor. The equivalent circuit shown in FIG. 9 comprises a low-pass filter as a first filter circuit F1 for passing transmission and reception signals of GSM while attenuating transmission and reception signals of DCS1800 and PCS, and a high-pass filter as a second filter circuit F2 for passing the transmission and reception signals of DCS1800 and PCS while attenuating the transmission and reception signals of GSM.

The low-pass filter F1 comprises a distributed constant line LF1, a capacitor CF1 connected in parallel to LF1, and a capacitor CF3 connected between LF1 and CF1 and a ground. The high-pass filter F2 comprises a distributed constant line LF2, a capacitor CF2 connected in parallel to LF2, a distributed constant line LF3 connected between LF2 and CF2 and a ground, and a capacitor CF4 connected in series to the distributed constant line LF2 and the capacitor CF2. Incidentally, the first and second filter circuits F1, F2 are not restricted to such a structure, permitting the following structures (a)–(h):

(a) A structure comprising a low-pass filter as a first filter circuit F1, and a notch filter as a second filter circuit F2;
(b) A structure comprising a notch filter as a first filter circuit F1, and a band-pass filter as a second filter circuit F2;
(c) A structure comprising a low-pass filter as a first filter circuit F1, and a band-pass filter as a second filter circuit F2;
(d) A structure comprising a notch filter as a first filter circuit F1, and a notch filter as a second filter circuit F2;
(e) A structure comprising a notch filter as a first filter circuit F1, and a high-pass filter as a second filter circuit F2;
(f) A structure comprising a band-pass filter as a first filter circuit F1, and a band-pass filter as a second filter circuit F2;
(g) A structure comprising a band-pass filter as a first filter circuit F1, and a notch filter as a second filter circuit F2; and
(h) A structure comprising a band-pass filter as a first filter circuit F1, and a high-pass filter as a second filter circuit F2.

(B) Switching Circuits

A diode and a distributed constant line are main elements in each of the first switch circuit SW1 disposed downstream of the first and second filter circuits F1, F2 for switching the transmission circuit TX1 and the reception circuit RX1 both for GSM, and the second switch circuit SW2 disposed downstream of the first and second filter circuits F1, F2 for switching the transmission circuit TX2 for DCS1800 and PCS, the reception circuit RX2 for DCS1800, and the reception circuit RX3 for PCS.

The first switch circuit SW1 is a switch circuit positioning on an upper side in FIG. 9, for switching the transmission circuit TX1 and the reception circuit RX1 for GSM. The first switch circuit SW1 comprises two diodes DG1, DG2 and two distributed constant lines LG1, LG2 as main elements. The diode DG1 is connected between an input/output terminal IP1, to which an anode of the diode DG1 is connected, and the transmission circuit TX1, and the distributed constant line LG1 is connected to a cathode of the diode DG1 and a ground. The distributed constant line LG2 is connected between the input/output terminal IP1 and the reception circuit RX1, and the diode DG2 is connected between one end of the distributed constant line LG2 on the side of the reception circuit RX1 and a ground. Further, the capacitor CG6 is connected between an anode of the diode DG2 and a ground. Connected in series between the above anode and the control circuit VC1 are an inductor LG and a resister R1.

Each of the distributed constant lines LG1 and LG2 has a line length in which their resonance frequencies are within a frequency band of the transmission signal of GSM. For instance, when their resonance frequencies are substantially equal to a middle frequency (897.5 MHz) of the transmission signal frequency of GSM, excellent insertion loss characteristics can be obtained within the desired frequency band. The low-pass filter circuit LPF inserted between the first filter circuit F1 and the transmission circuit TX1 preferably comprises a distributed constant line and capacitor. In the equivalent circuit shown in FIG. 9, a π-type low-pass filter constituted by a distributed constant line LG3 and capacitors CG3, CG4 and CG7 is preferably inserted between the diode DG1 and the distributed constant line LG1.

The second switch circuit SW2 using the high-frequency switch circuit of the present invention is a switch circuit positioning on a lower side in FIG. 9 comprising a switch circuit SW2-1 for switching the reception circuit RX2 for DCS1800 and the reception circuit RX3 for PCS, and another switch circuit SW2-2 for switching the transmission circuit TX2 for DCS1800 and PCS and the above switch circuit SW2-1 for DCS1800 and PCS. The second switch circuit SW2 comprises four diodes DP1, DP2, DD1 and DD2 and four distributed constant lines LP1, LP2, LD2 and LD1, whereby the switch circuit SW2-1 comprises two diodes DD1, DD2 and two distributed constant lines LD2, LD1, and the switch circuit SW2-2 comprises two diodes DP1, DP2 and two distributed constant lines LP1, LP2.

In the switch circuit SW2-2, a first diode DP1 is connected between the transmission circuit (TX2) and the second filter circuit (F2). A third distributed constant line LP1 is connected between a cathode of the diode DP1 and a ground.

A first distributed constant line LP2 is connected between the input/output terminal IP2 and a third output terminal IP3 for outputting a reception signal of the second and third transmitting and receiving systems, a second diode DP2 is connected to a ground at the other side of the first distributed line LP2, and an anode of the diode DP2 is connected to a control circuit VC3 via an inductor LP and a resister R3.

In the switch circuit SW2-1, a third diode DD2 is connected between the third output terminal IP3 and the reception circuit RX3, and a fourth distributed constant line LD2 is connected between the reception circuit RX3 and the ground. A second distributed constant line LD1 is connected between the reception circuit RX2 and a third output terminal IP3.

A fourth diode DD1 connected to a ground at the other side of the second distributed constant line LD1. A control circuit VC5 is connected between the diode DD1 and the capacitor CDP2 via an inductor LD and a resister R6.

Each of the distributed constant lines LP1 and LP2 preferably has a line length in which their resonance frequencies are within a range from the maximum frequency to the minimum frequency in a frequency band of the transmission signal of the second and third transmitting and receiving systems, particularly a middle frequency of the maximum frequency and the minimum frequency. For instance, when the resonance frequencies of the distributed constant lines LP1 and LP2 are substantially equal to a middle frequency (1810 MHz) of the transmission signal frequencies of DCS1800 and PCS, excellent electric characteristics can be obtained in respective modes, thereby making it possible to handle two transmission signals in a single circuit.

A low-pass filter circuit LPF inserted between the second filter circuit F2 and the transmission circuit TX2 is preferably constituted by a distributed constant line and a capacitor. In the equivalent circuit shown in FIG. 2, a π-type low-pass filter constituted by a distributed constant line LP3 and capacitors CP3, CP4 and CP7 is preferably inserted between the diode DP1 and the distributed constant line LP 1.

In the low-pass filter circuit LPF, the length of the distributed constant line LP3 is preferably λ/8 to λ/12, wherein λ is a middle frequency of the transmission signal in the second and third transmitting and receiving systems. For instance, in a case where the second transmitting and receiving system is DCS1800 and the third transmitting and receiving system is PCS, the middle frequency λ of the transmission signal in the second and third transmitting and receiving systems is equal to a frequency (1810 MHz) intermediate between the transmission signal of DCS1800 (1710–1785 MHz) and the transmission signal of PCS (1850–1910 MHz). When the distributed constant line LP3 is as long as more than λ/8 relative to the middle frequency λ, the pass band is narrow, failing to obtain the desired insertion loss characteristics at the lowest frequency of the transmission signal of DCS1800 and in the vicinity of the transmission signal of PCS. Also, when the distributed constant line LP3 is as short as less than λ/12, the attenuation of higher frequencies such as double wave, triple wave, etc. is deteriorated. Thus, both cases are not preferable because the high-frequency switch module exhibits deteriorated characteristics.

Figure 16:
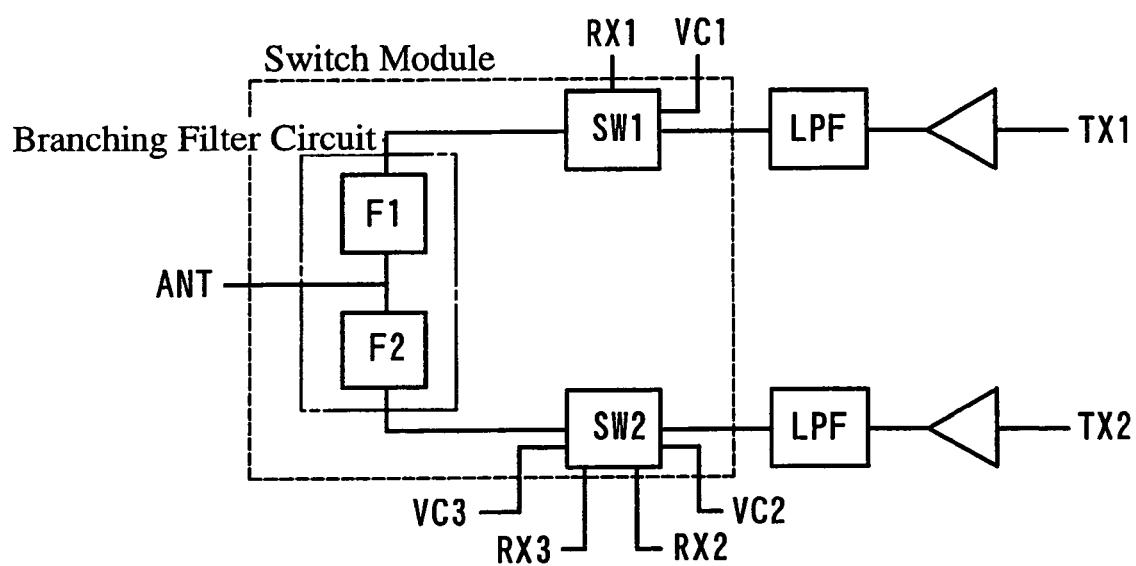
FIG. 16 is a reference block diagram showing a circuit of a high-frequency switch module according to a further reference embodiment of the present invention.

The low-pass filter circuit LPF is not restricted to that contained in the switch module as shown in FIG. 1, and may be disposed downstream of the high-frequency switch module as shown in FIG. 16. In this case, the low-pass filter circuit LPF may be composed of a ceramic filter, etc.

[2] Operation

The high-frequency switch module using the high-frequency switch circuit of the present invention selects one of the first, second and third transmitting and receiving systems by controlling the on/off of the diode switches by applying voltage from a power supply means (control circuit). With respect to the high-frequency switch module shown in FIG. 9, its operation will be explained in detail below.

(A) DCS/PCS TX Mode

To connect the transmission circuit TX2 of the second and third transmitting and receiving systems to the second filter circuit F2, positive voltage is applied from the control circuit VC3, while zero voltage is applied from the control circuit VC5. The positive voltage applied from the control circuit VC3 is deprived of a DC component by capacitors CP2, CP3, CP4, CP5, CP6 and CF4 and applied to a circuit including diodes DP1, DP2. As a result, the diodes DP1, DP2 are turned on. When the diodes DP1, DP2 are turned on, impedance becomes low between the transmission circuit TX2 of the second and third transmitting and receiving systems and the connecting point IP2. Also, with the turned-on diode DP2 and the capacitor CP6, the distributed constant line LP2 is grounded in a high-frequency manner, resulting in resonance. This leads to extremely large impedance when the connecting point IP3 is viewed from the connecting point IP2. As a result, the transmission signal from the transmission circuit TX2 of the second and third transmitting and receiving systems is transmitted to the second filter circuit F2, without leaking to the second reception circuit RX2 and the third reception circuit RX3.

(B) DCS RX Mode

To connect the second reception circuit RX2 to the second filter circuit F2, zero voltage is applied from the control circuits VC3 and VC5, leaving the diodes DP1, DP2, DD1 and DD2 in an OFF state. With the diodes DP1, DP2, DD1 and DD2 in an OFF state, the connecting point IP2 is connected to the second reception circuit RX2 via the distributed constant line LP2, the capacitor CP5 and the distributed constant line LD1. Also, with the diode DP1 in an OFF state, there is large impedance between the connecting point IP2 and the transmission circuit TX2 of the second and third transmitting and receiving systems. Further, with the diode DD2 in an OFF state, there is large impedance between the connecting point IP2 and the third reception circuit RX3. As a result, the reception signal from the second filter circuit F2 is transmitted to the second reception circuit RX2, without leaking to the transmission circuit TX2 of the second and third transmitting and receiving systems and the third reception circuit RX3.

(C) PCS RX Mode

To connect the third reception circuit RX3 to the second filter circuit F2, positive voltage is applied from the control circuit VC5, and zero voltage is applied from the VC3. Positive voltage applied from the control circuit VC5 is deprived of a DC component by the capacitors CDP1, CDP2, CDP3 and CP5, and applied to a circuit comprising the DD1, DD2. As a result, the diodes DD1, DD2 are turned on, while the diodes DD1, DD2 are turned off. With the diode DD2 in an ON state, there is small impedance between the third reception circuit RX3 and the connecting point IP2. Also, with the diode DD1 in an ON state and the capacitor CDP2, the distributed constant line LD1 is grounded in a high-frequency manner, resulting in resonance in a frequency band of the reception signals for DCS1800 and PCS. Thus, impedance when the second reception circuit RX2 is viewed from the connecting point IP2 is extremely large in a frequency band of the reception signals for DCS1800 and PCS. Further, with the diode DP1 in an OFF state, there is large impedance between the connecting point IP2 and the transmission circuit TX2. As a result, the reception signal from the second filter circuit F2 is transmitted to the third reception circuit RX3 without leaking to the transmission circuit TX2 of the second and third transmitting and receiving systems and the second reception circuit RX2.

(D) GSM TX Mode

To connect the first transmission circuit GSM TX to the first filter circuit F1, positive voltage is applied from the control circuit VC1. The positive voltage is deprived of a DC component by the capacitors CG6, CG5, CG4, CG3, CG2 and CG1, and applied to a circuit comprising the diodes DG2 and DG1. As a result, the diodes DG2 and DG1 are turned on. With the diode DG1 in an ON state, there is low impedance between the first transmission circuit TX1 and the connecting point IP1. With the diode DG2 in an ON state and the capacitor CG6, the distributed constant line LG2 is grounded in a high-frequency manner, resulting in resonance. Thus, impedance is extremely large when the first reception circuit RX1 is viewed from the connecting point IP1. As a result, the transmission signal from the first transmission circuit TX1 is transmitted to the first filter circuit F1 without leaking to the reception circuit RX1.

(E) GSM RX Mode

To connect the first reception circuit GSM RX to the first filter circuit F1, zero voltage is applied from the control circuit VC1 to turn off the diodes DG1 and DG2. With the diode DG2 in an OFF state, the connecting point IP1 is connected to the first reception circuit RX1 via the distributed constant line LG2. Also, with the diode DG1 in an OFF state, there is large impedance between the connecting point IP1 and the first transmission circuit TX1. As a result, the reception signal from the first filter circuit F1 is transmitted to the first reception circuit RX1 without leaking to the first transmission circuit TX1.

The present invention will be explained in further detail by the following EXAMPLE without intention of restricting the scope of the present invention thereto.

REFERENCE EXAMPLE 1

Figure 2:
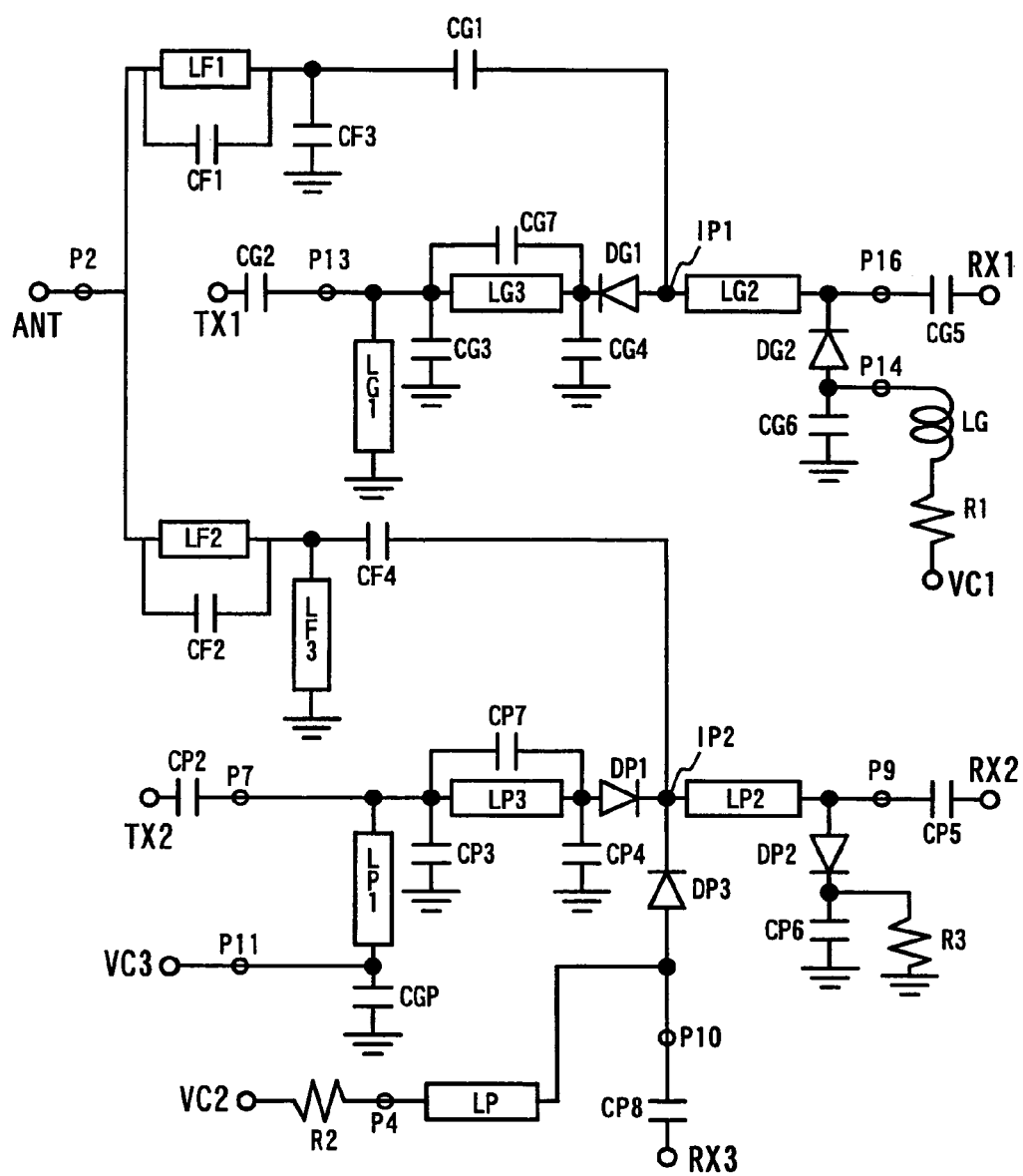
FIG. 2 is a reference schematic view showing an equivalent circuit of the high-frequency switch module according to one reference embodiment of the present invention.
Figure 3:
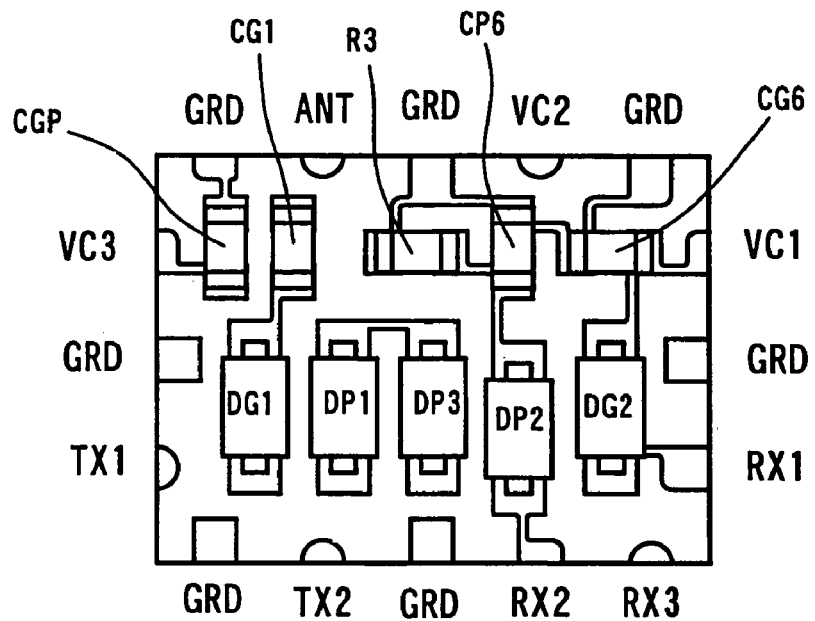
FIG. 3 is a reference plan view showing the high-frequency switch module according to one reference embodiment of the present invention.
Figure 4:
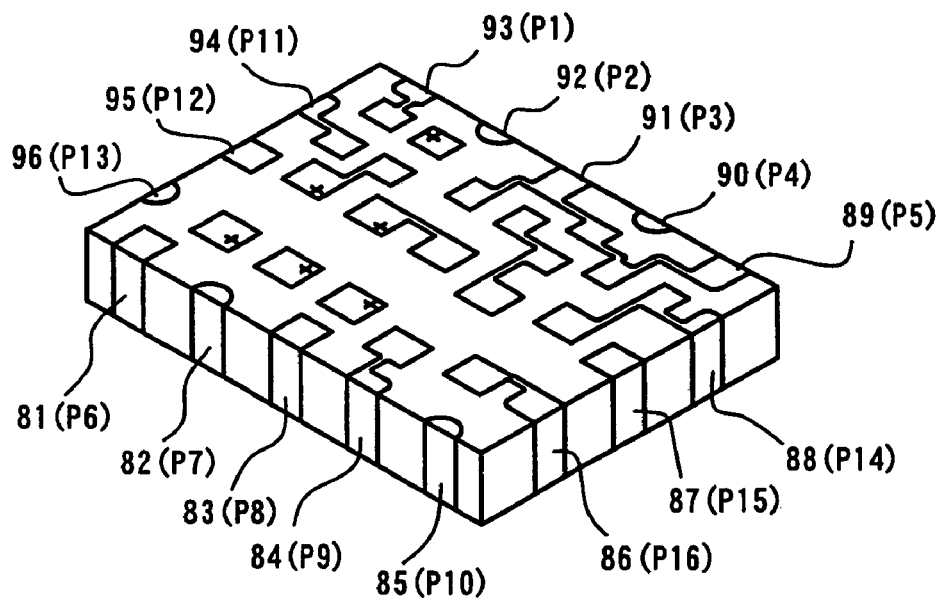
FIG. 4 is a reference perspective view showing the high-frequency switch module according to one reference embodiment of the present invention.
Figure 5:
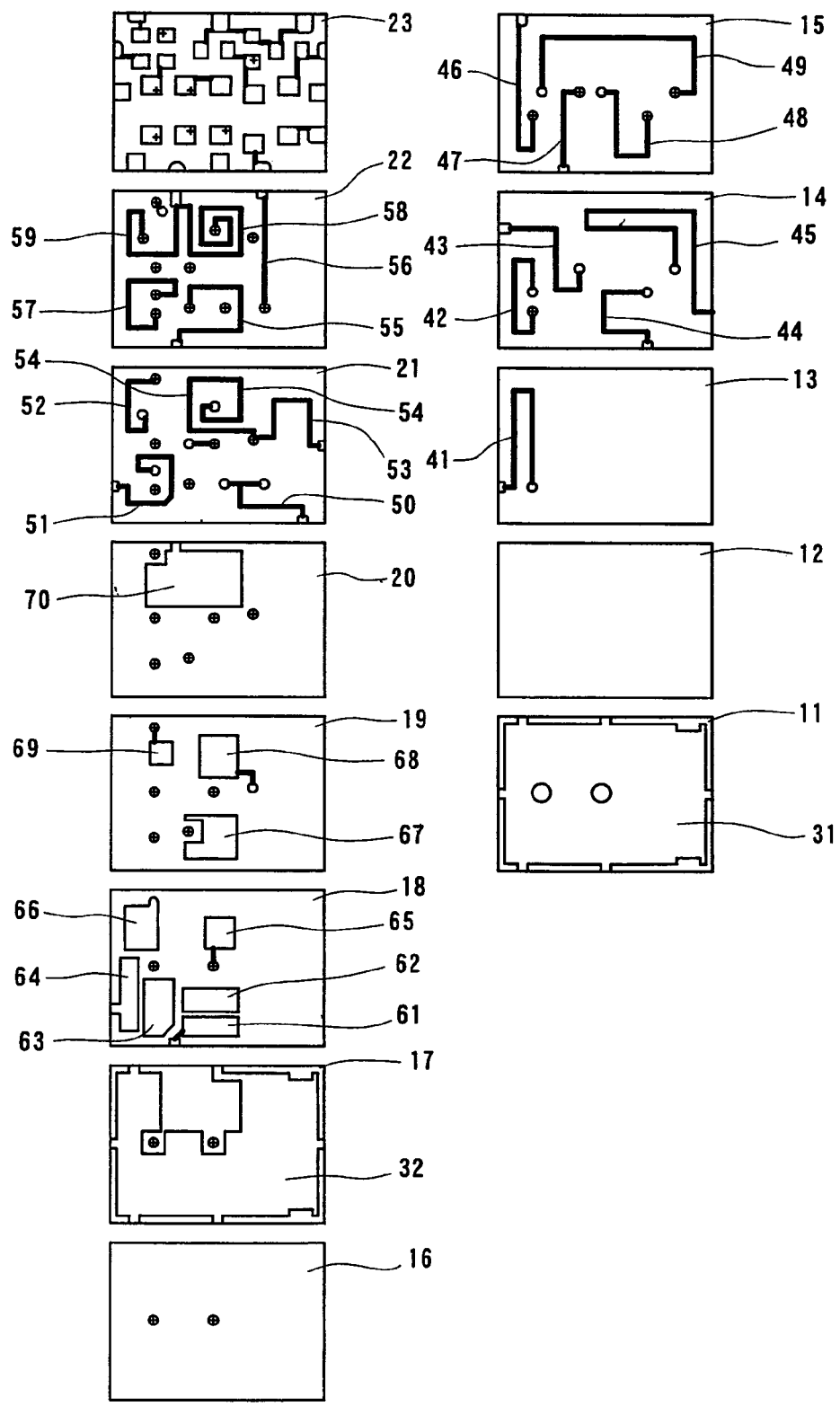
FIG. 5 is a view showing a reference internal structure of the high-frequency switch module according to one reference embodiment of the present invention.

FIG. 3 is a reference plan view showing the high-frequency switch module using a high-frequency switch circuit of the present invention in this REFERENCE EXAMPLE, FIG. 4 is a reference perspective view showing a laminate portion thereof, and FIG. 5 is a reference development view showing the structure of each layer constituting the laminate of FIG. 4. In REFERENCE EXAMPLE 1, the distributed constant lines of the first and second filter circuits, the low-pass filter circuit and the switch circuits are formed in the laminate, while diodes and high-capacitance capacitors as chip capacitors, which cannot be formed in the laminate, are mounted onto the laminate, resulting in a one-chip, triple-band, high-frequency switch module. Incidentally, symbols P1 to P16 attached to external terminals in FIG. 4 correspond to symbols such as P2, P4, etc. attached to the equivalent circuit of FIG. 2.

This laminate can be produced by (a) preparing green sheets of 50–200 μm in thickness from low-temperature-sinterable dielectric ceramics; (b) printing an electrically conductive, Ag-based paste onto each green sheet to form a desired electrode pattern; (c) integrally laminating a plurality of green sheets having desired electrode patterns; and (d) burning the resultant laminate. Line electrodes are preferably as wide as 100–400 μm.

The internal structure of the laminate will be explained in the order of lamination. First, a green sheet 11 for the lowermost layer is coated with a ground electrode 31 in substantially all surface and provided with connecting portions for connection to terminal electrodes 81, 83, 87, 89, 91, 93 and 95 on side surfaces.

After laminating a green sheet 12 with no printed electrode onto the green sheet 11, a green sheet 13 formed with one line electrode 41, a green sheet 14 formed with four line electrodes 42, 43, 44 and 45, and a green sheet 15 formed with four line electrodes 46, 47, 48 and 49 are laminated in this order thereonto. Laminated thereonto is a green sheet 16 formed with two through-hole electrodes (marked with "+" in the figure), and further laminated thereonto is a green sheet 17 formed with a ground electrode 32.

Proper connection of line electrodes in regions sandwiched by the two ground electrodes 31, 32 forms distributed constant lines for the first and second switch circuits SW1, SW2. Specifically referring to the equivalent circuit of FIG. 2, the line electrodes 41, 42 and 46 connected via through-hole electrodes constitute a distributed constant line LG1, the line electrodes 45 and 49 connected via through-hole electrodes constitute a distributed constant line LG2, the line electrodes 43 and 47 connected via through-hole electrodes constitute a distributed constant line LP1, and the line electrodes 44 and 48 connected via through-hole electrodes constitute a distributed constant line LP2.

Formed on a green sheet 18 laminated onto the green sheet 17 are electrodes 61, 62, 63, 64, 65 and 66 for capacitors. A green sheet 19 laminated thereon is also formed with electrodes 67, 68 and 69 for capacitors. A green sheet 20 laminated thereon is formed with a capacitor electrode 70.

Laminated thereon are a green sheet 21 formed with line electrodes 50, 51, 52, 53 and 54, and a green sheet 22 formed with line electrodes 55, 56, 57, 58 and 59 in this order. An uppermost green sheet 23 is formed with lands for mounting elements.

Each of electrodes 61, 62, 63, 64 and 66 for capacitors on the green sheet 18 constitutes capacitance with a ground electrode 32 formed on the green sheet 17. Specifically referring to the equivalent circuit of FIG. 2, the capacitor electrode 61 constitutes a capacitor CP3, the capacitor electrode 62 constitutes a capacitor CP4, the capacitor electrode 63 constitutes a capacitor CG4, the capacitor electrode 64 constitutes a capacitor CG3, and the capacitor electrode 66 constitutes a capacitor CF3.

Electrodes for capacitors formed on the green sheets 18, 19 and 20 constitute capacitance. Specifically referring to the equivalent circuit of FIG. 2, the capacitor electrodes 65 and 68 constitute a capacitor CF4, the capacitor electrodes 61 and 62 and 67 constitute a capacitor CP7, the capacitor electrodes 69 and 70 constitute a capacitor CF1, and the capacitor electrodes 68 and 70 constitute a capacitor CF2. Incidentally, the capacitor electrode 65 and the capacitor electrode 68 opposing each other constitute capacitance, though a ground electrode 32 is provided with notches such that these electrodes do not oppose the ground electrode 32. Through-hole electrodes for connecting the distributed constant lines are positioned in the notches.

In the green sheets 21, 22, the line electrodes 52, 59 constitute a distributed constant line LF1; the line electrodes 54, 58 constitute a distributed constant line LF2; the line electrode 53 constitutes a distributed constant line LF3; the line electrodes 51, 57 constitute a distributed constant line LG3; the line electrode 55 constitutes a distributed constant line LP3; and the line electrode 56 constitutes a distributed constant line LP. Also, the line electrode 50 functions as a line for wiring. Because the line electrodes 51, 57 constituting the distributed constant line LG3 are formed such that they are partially opposing each other, their opposing portions form a capacitor CG7.

Laminated green sheets are integrally pressure-bonded and burned at a temperature of 900° C., to provide a laminate of 6.7 mm×5.0 mm×1.0 mm in outer size. The resultant laminate is formed with terminal electrodes 81-96 on side surfaces. The appearance of the laminate is shown in FIG. 4.

Mounted onto this laminate are diodes DG1, DG2, DP1, DP2 and DP3, chip capacitors CG1, CG6, CGP and CP6, and a chip resister R3. FIG. 3 is a plan view showing the laminate mounting these elements. FIG. 3 also shows a mounting structure (connection structure of each terminal) of this high-frequency switch module. Incidentally, in FIG. 3, etc., GRD means a terminal connected to a ground.

In this REFERENCE EXAMPLE, CP2, CP5, CG2, CG5, R1, LG, R2 and CP8 in the equivalent circuit shown in FIG. 2 are formed on a circuit mounting chip parts.

In this REFERENCE EXAMPLE, because the distributed constant lines of the first and second switch circuits are formed in regions sandwiched by ground electrodes in the laminate, interference is prevented between the switch circuits, and the branching filter circuit and the low-pass filter circuit. Also, because regions sandwiched by the ground electrodes are disposed in a lower part of the laminate, a ground voltage can easily be obtained. Formed at a position opposing an upper ground electrode is an electrode for constituting a capacitor with the upper ground electrode.

As shown in FIGS. 3 and 4, the laminate in this REFERENCE EXAMPLE is formed with terminals on side surfaces, whereby surface mounting can be achieved. Terminals mounted onto side surfaces of the laminate are an ANT terminal (P2), a TX2 terminal (P7) for DCS/PCS, a TX1 terminal (P13) for GSM, an RX1 terminal (P16) for GSM, an RX2 terminal (P9) for DCS1800, an RX3 terminal (P10) for PCS, a ground terminal (GRD), and control terminals (VC1, VC2, VC3). In addition, each side surface of this laminate is provided with at least one ground terminal.

In this REFERENCE EXAMPLE, the ANT terminal, the TX terminals and the RX terminals are respectively sandwiched by ground terminals. Also, VC1, VC2 and VC3 are respectively sandwiched by ground terminals.

Table 1 shows the control logic of each control circuit VC1, VC2 and VC3 for switching each mode of GSM, DCS1800 and PCS in the high-frequency switch module in this REFERENCE EXAMPLE.

TABLE 1

| Mode | VC1 | VC2 | VC3 |
| --- | --- | --- | --- |
| GSM TX | High | Low | Low |
| DCS TX | Low | Low | High |
| PCS TX | Low | Low | High |
| GSM RX | Low | Low | Low |
| DCS RX | Low | Low | Low |
| PCS RX | Low | High | Low |

FIGS. 11–15 show the reference characteristics of insertion loss and isolation at the time of transmission and reception in each communication mode. As shown in FIGS. 11–15, excellent insertion loss characteristics and isolation characteristics were obtained in a desired frequency band in each communication mode, verifying that this REFERENCE EXAMPLE provided a miniaturized, high-performance, high-frequency switch module.

REFERENCE EXAMPLE 2

Figure 6:
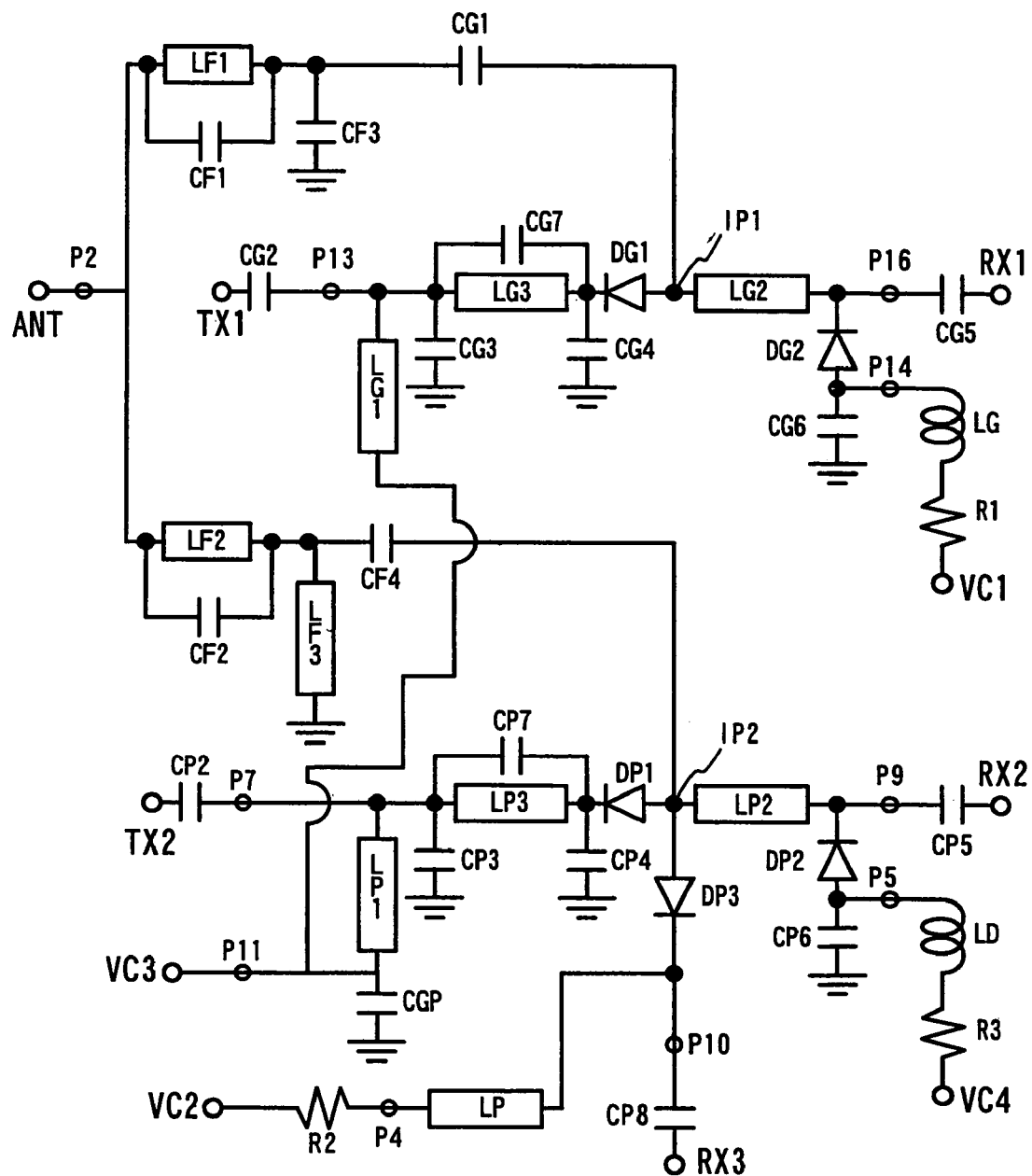
FIG. 6 is a reference schematic view showing an equivalent circuit of a high-frequency switch module according to another reference embodiment of the present invention.
Figure 7:
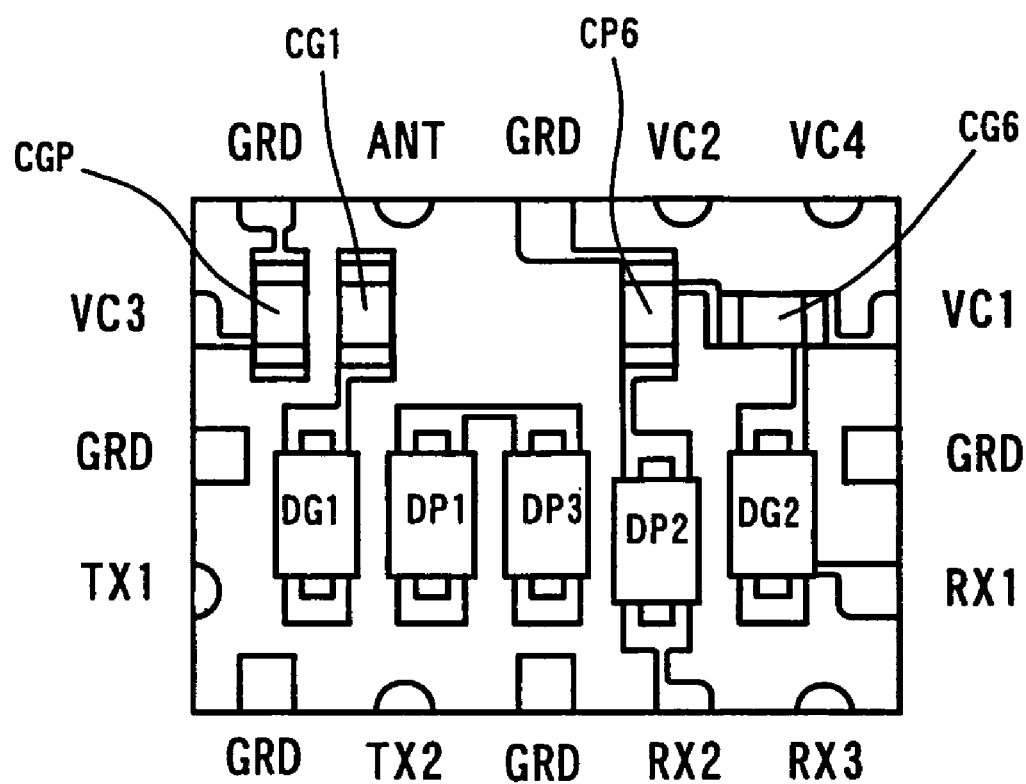
FIG. 7 is a reference plan view showing the high-frequency switch module according to another reference embodiment of the present invention.
Figure 8:
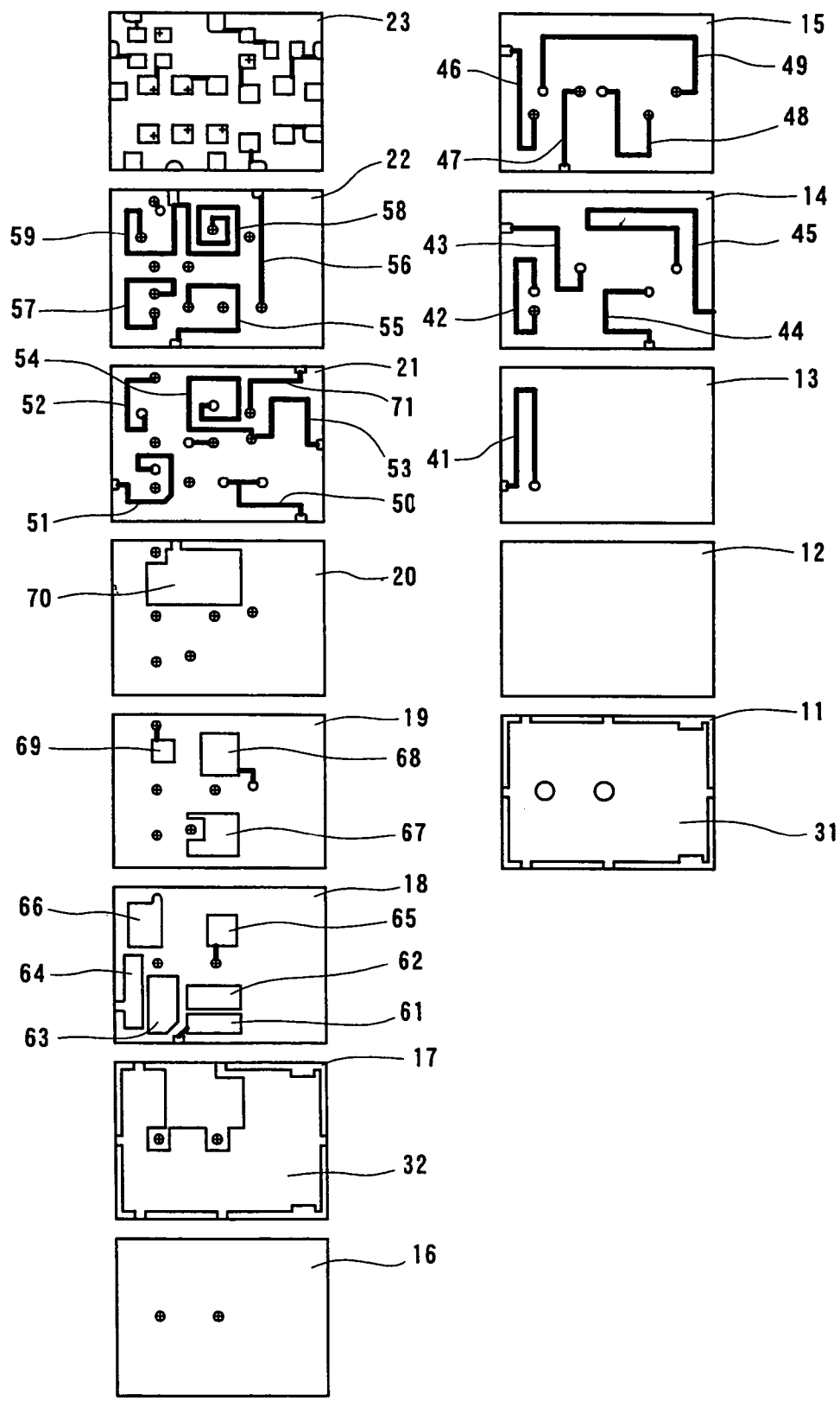
FIG. 8 is a reference view showing an internal structure of the high-frequency switch module according to another reference embodiment of the present invention.

FIG. 6 shows a reference equivalent circuit of a high-frequency switch module using a high-frequency switch circuit according to another embodiment of the present invention; FIG. 7 is a reference plan view showing the high-frequency switch module; and FIG. 8 shows the reference internal structure of a laminate for the high-frequency switch module. Because there are many parts common in this REFERENCE EXAMPLE and REFERENCE EXAMPLE 1, explanation will be restricted here to only different parts.

The first and second filter circuits are the same as those in REFERENCE EXAMPLE 1. A first switch circuit SW1 in the first transmitting and receiving system (GSM) is also the same as in REFERENCE EXAMPLE 1, except that a distributed constant line LG1 is connected to a control circuit VC3 together with a distributed constant line LP1 of the second switch circuit SW2 without being connected to a ground electrode. In the second switch circuit, the directions of diodes DP1, DP2 and DP3 are opposite to those in REFERENCE EXAMPLE 1, and a control circuit VC4 is connected via a series-connected circuit of an inductor LD and a resister R3 between the diode DP2 and the capacitor CP6.

With respect to the structure of the high-frequency switch module, it differs from that of REFERENCE EXAMPLE 1 in the following points. A ground electrode 31 on a green sheet 11 is not connected to a terminal electrode 89. In a green sheet 15, a lead terminal of a line electrode 46 is modified. In a green sheet 17, a ground electrode 32 is not connected to a terminal electrode 89. In a green sheet 21, a line electrode 71, wiring line, is added. In a green sheet 22, a through-hole for connecting to the line electrode 71 is added. Also, in a green sheet 23, the shape of a land is modified.

Mounted onto the laminate are diodes DG1, DG2, DP1, DP2 and DP3 and chip capacitors CG1, CG6, CGP and CP6. FIG. 7 shows a laminate mounted with these elements. FIG. 7 also shows the mounting structure (connecting structure of each terminal) of the high-frequency switch module. In this REFERENCE EXAMPLE, CP2, CP5, CG2, CG5, R1, LG, R2, CP8, R3 and LD among elements constituting the equivalent circuit of FIG. 6 are mounted onto a chip-part-mounting circuit.

Table 2 shows the control logic of each control circuit VC1 to VC4 for switching each mode in the high-frequency switch module in this REFERENCE EXAMPLE.

TABLE 2

| Mode | VC1 | VC2 | VC3 | VC4 |
| --- | --- | --- | --- | --- |
| GSM TX | High | Low | Low | Low |
| DCS TX | Low | High | Low | High |
| PCS TX | Low | High | Low | High |
| GSM RX | Low | Low | Low | Low |
| DCS RX | Low | Low | Low | Low |
| PCS RX | Low | Low | High | High |

The high-frequency switch module of this REFERENCE EXAMPLE can be used in three different communication modes, exhibiting the same effects as in REFERENCE EXAMPLE 1.

EXAMPLE 1

FIG. 9 shows an equivalent circuit of a high-frequency switch module using a high-frequency switch circuit according to one embodiment of the present invention. Because there are many parts common in this EXAMPLE and REFERENCE EXAMPLE 1, explanation will be restricted here to only different parts.

First and second filter circuits and a first switch circuit SW1 in the first transmitting and receiving system (GSM) are the same as in REFERENCE EXAMPLE 1 with respect to an equivalent circuit. A second switch circuit SW2 comprises an input/output terminal IP2 for inputting a reception signal for the second and third transmitting and receiving systems from the second filter circuit F2 and outputting a transmission signal from the transmission circuit TX2 of the second and third transmitting and receiving systems; an input terminal for inputting a transmission signal from the transmission circuit TX2 of the second and third transmitting and receiving system; a third output terminal IP3 for outputting a reception signal of the second and third transmitting and receiving systems; and a fourth output terminal for outputting a reception signal of the second transmitting and receiving system to the reception circuit RX2; a fifth output terminal for outputting a reception signal of the third transmitting and receiving system to the reception circuit RX3; a first diode DP1 connected between the input/output terminal IP2 and the input terminal; a third distributed constant line LP1 connected between the input terminal and a ground; a first distributed constant line LP2 connected between the input/output terminal IP2 and the third output terminal IP3; a second diode DP2 connected between the third output terminal IP3 and the ground; a third distributed constant line LD1 connected between the third output terminal IP3 and the fourth output terminal; a fourth diode DD1 connected between the fourth output terminal and the ground; a third diode DD2 connected between the third output terminal IP3 and the fifth output terminal; and a fourth distributed constant line LD2 connected between the fifth output terminal and the ground.

As described above, the second switch circuit SW2 comprises a switch circuit SW2-1 for switching the reception circuit RX2 for DCS and the reception circuit RX3 for PCS, and another switch circuit SW2-2 for switching the transmission circuit TX2 and the above switch circuit SW2-1 for DCS/PCS. The switch circuit SW2-1 for switching the reception circuit RX2 for DCS and the reception circuit RX3 for PCS comprises two diodes DD1, DD2 and two distributed constant lines LD1, LD2 as main elements, the diode DD2 having an anode connected to a connecting point IP3 and a cathode connected to RX3 and a cathode connected to the distributed constant line LD2 connected to the ground. The distributed constant line LD1 is connected between the connecting point IP3 and the reception circuit RX2, and the diode DD1 connected to the ground via the capacitor CDP2 is disposed on the side of the reception circuit RX2. A control circuit VC5 is connected between the diode DD1 and the capacitor CDP2 via an inductor LD and a resist R6.

Disposed upstream of this switch circuit SW2-1 is another switch circuit SW2-2 for switching the transmission circuit TX2 for DCS/PCS and the switch circuit SW2-1. This switch circuit SW2-2 comprises two diodes DP2, DP1 and two distributed constant lines LP1, LP2 as main elements. The diode DP1 is connected between TX2 and the connecting point IP2, the diode DP1 having an anode connected to the connecting point IP2 and a cathode connected to the distributed constant line LP1 connected to a ground. The distributed constant line LP2 is connected between the connecting points IP2 and IP3, and the diode DP2 connected to a ground via the capacitor CP6 is disposed on the side of the connecting point IP3. Also connected between the diode DP2 and the capacitor CP6 is a control circuit VC3 via an inductor LP and a resister R3.

Table 3 shows the control logic of each control circuit VC1, VC3 and VC5 for switching each mode in the high-frequency switch module in this EXAMPLE.

TABLE 3

| Mode | VC 1 | VC3 | VC5 |
|---|---|---|---|
| GSM TX | High | Low | Low |
| DCS TX | Low | High I | Low |
| PCs TX | Low | High | Low |
| GSM RX | Low | Low | Low |
| DCS RX | Low | Low | Low |
| PCs RX | Low | Low | High |

The high-frequency switch module of this EXAMPLE can be used in three different communication modes, exhibiting the same effects as in REFERENCE EXAMPLE 1.

REFERENCE EXAMPLE 9

Figure 10:
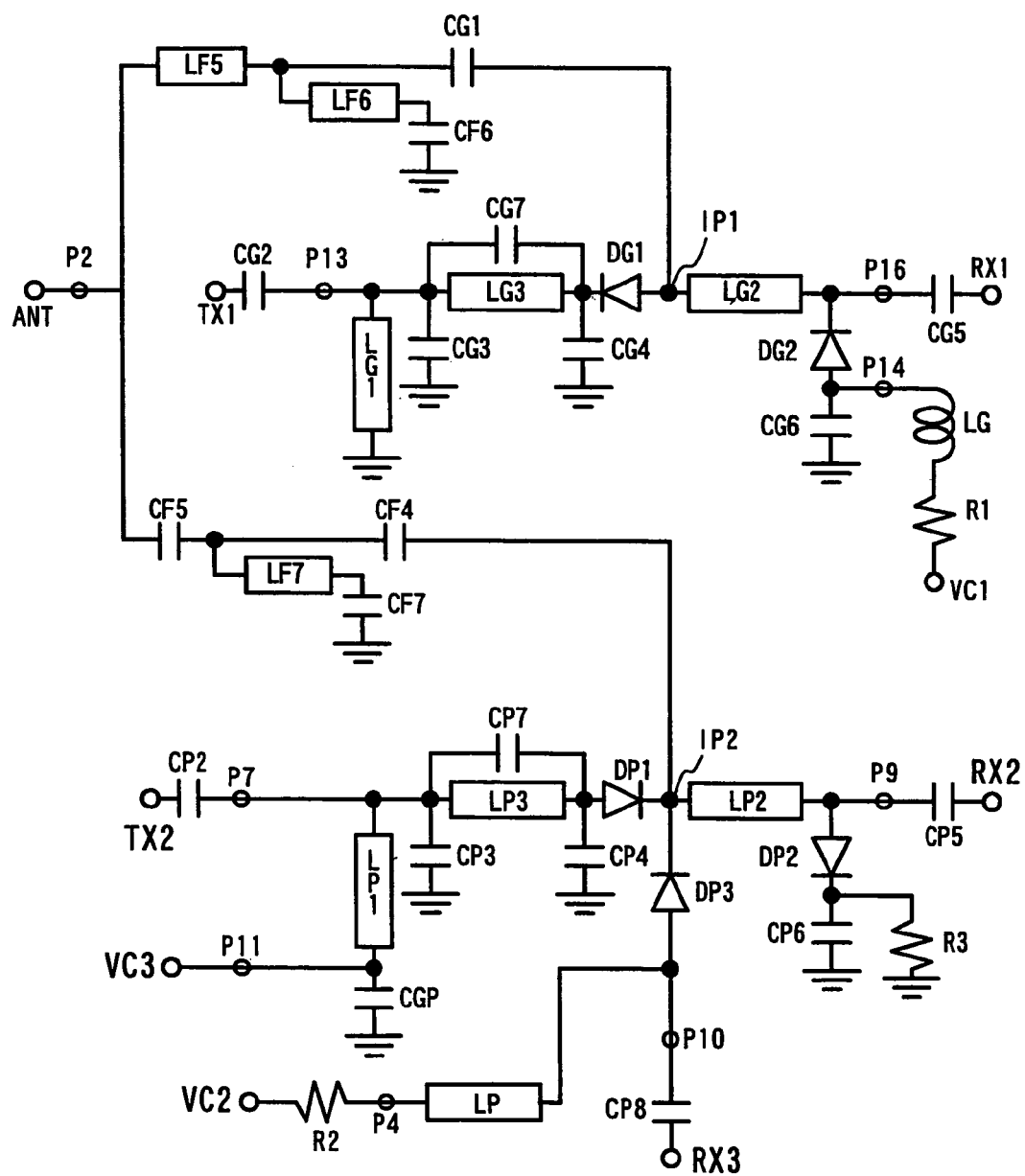
FIG. 10 is a reference schematic view showing an equivalent circuit of a high-frequency switch module according to another reference embodiment of the present invention.
Figure 11A:
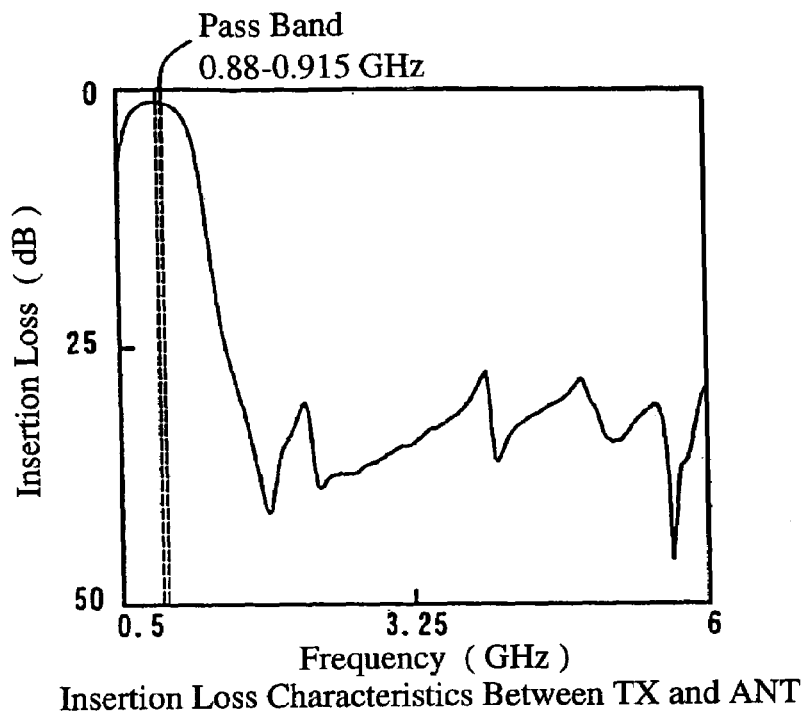
FIG. 11(a) is a reference graph showing the characteristics of insertion loss between TX1 and ANT in a GSM TX mode in the high-frequency switch module in REFERENCE EXAMPLE 1.
Figure 11B:
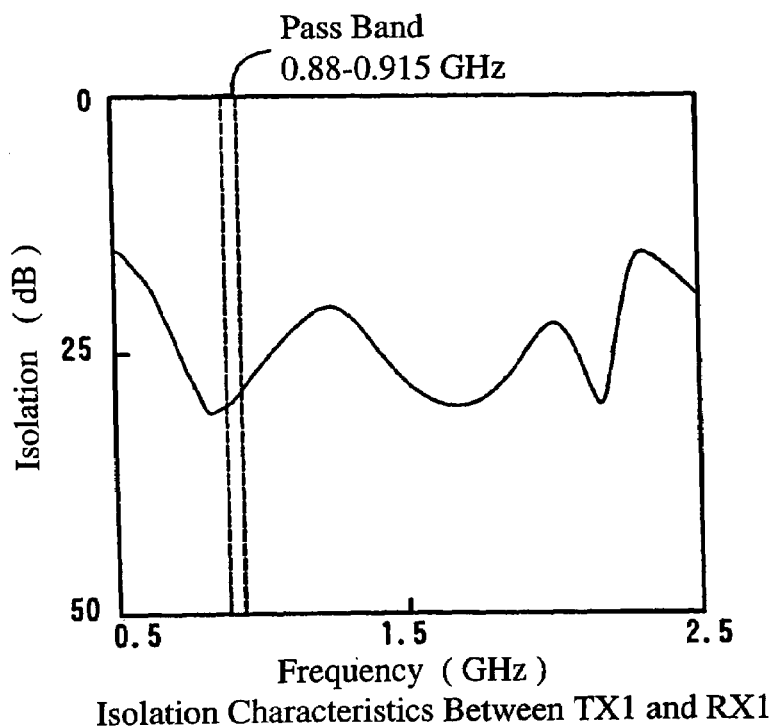
FIG. 11(b) is a reference graph showing the characteristics of isolation between TX1 and RX1 in a GSM TX mode in the high-frequency switch module in REFERENCE EXAMPLE 1.
Figure 12A:
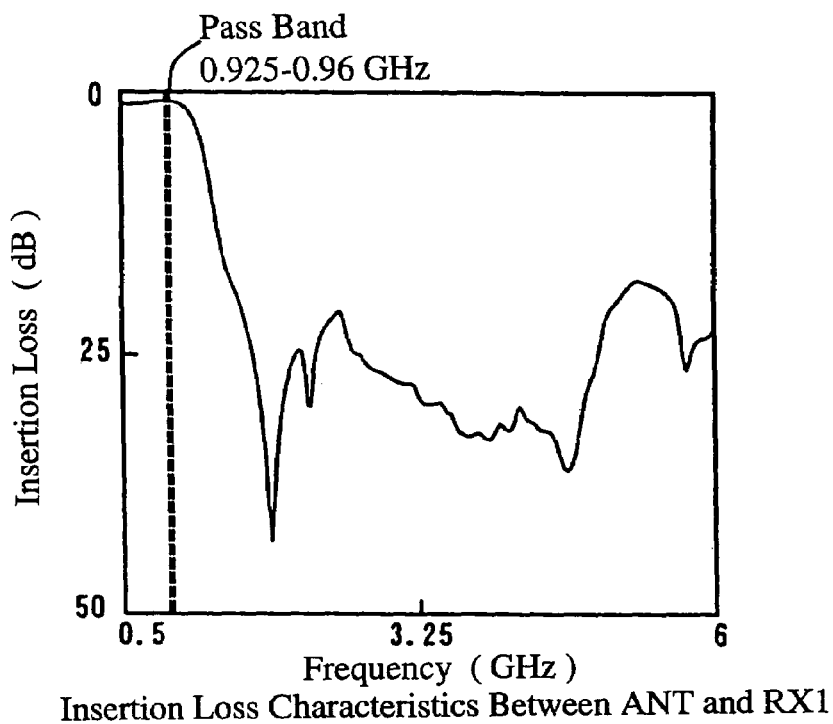
FIG. 12(a) is a reference graph showing the characteristics of insertion loss between ANT and RX1 in a GSM RX mode in the high-frequency switch module in REFERENCE EXAMPLE 1.
Figure 12B:
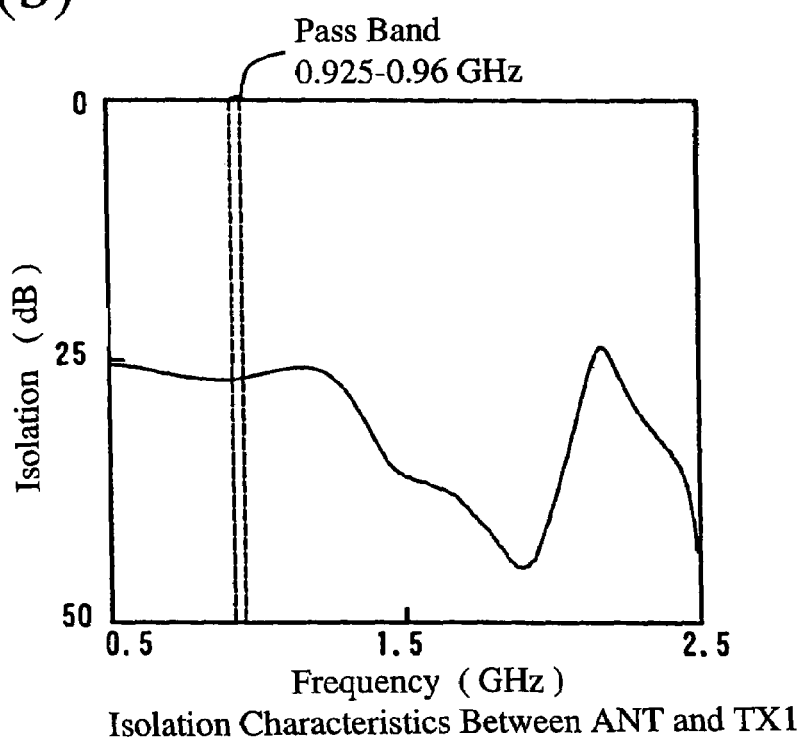
FIG. 12(b) is a reference graph showing the characteristics of isolation between ANT and TX1 in a GSM RX mode in the high-frequency switch module in REFERENCE EXAMPLE 1.
Figure 13A:
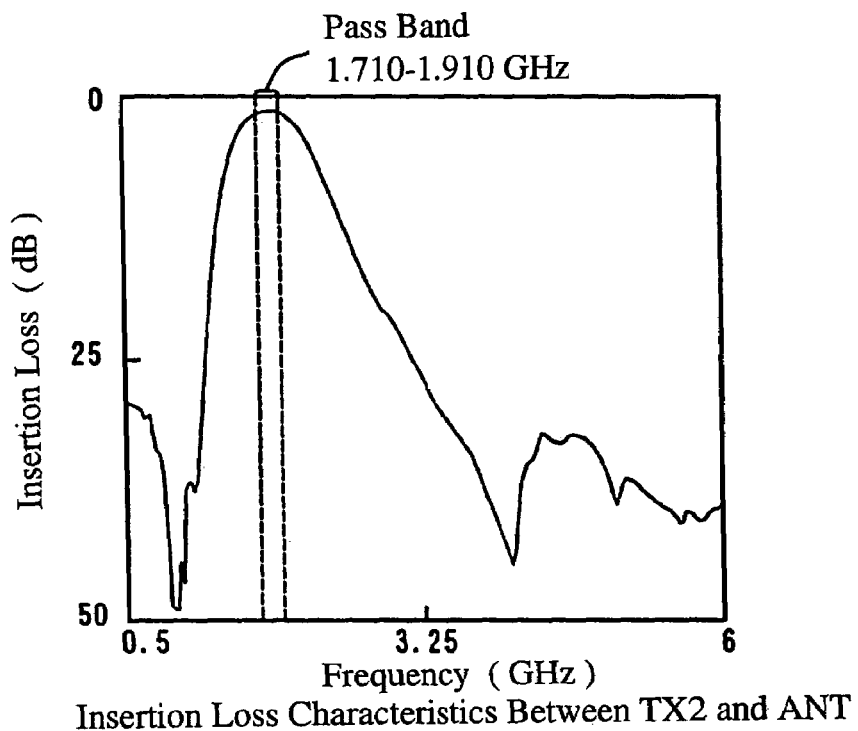
FIG. 13(a) is a reference graph showing the characteristics of insertion loss between TX2 and ANT in a DCS/PCS TX mode in the high-frequency switch module in REFERENCE EXAMPLE 1.
Figure 13B:
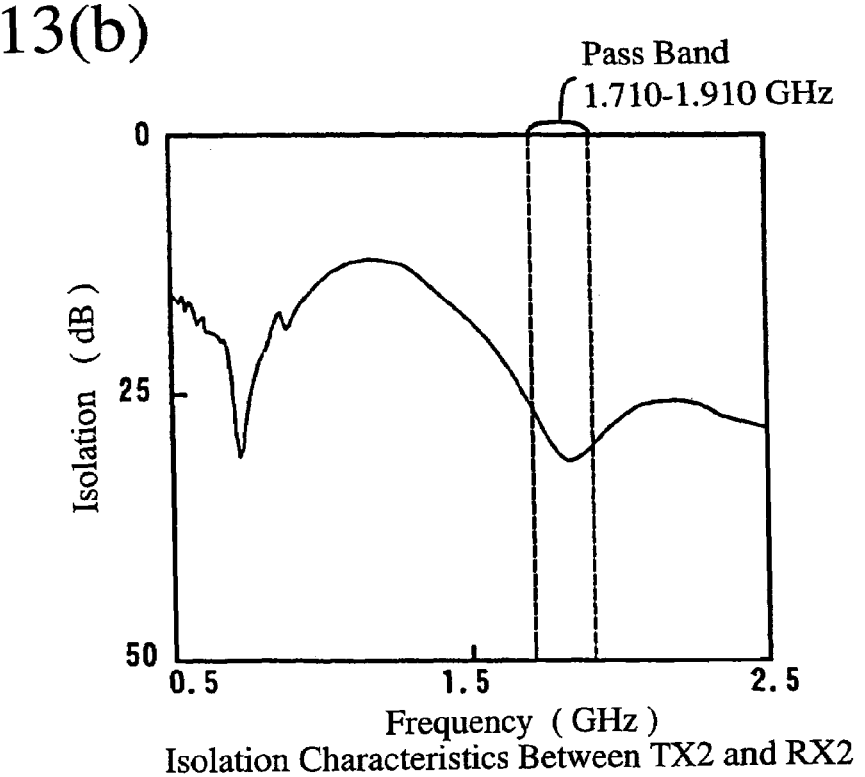
FIG. 13(b) is a reference graph showing the characteristics of isolation between TX2 and RX2 in a DCS/PCS TX mode in the high-frequency switch module in REFERENCE EXAMPLE 1.
Figure 13C:
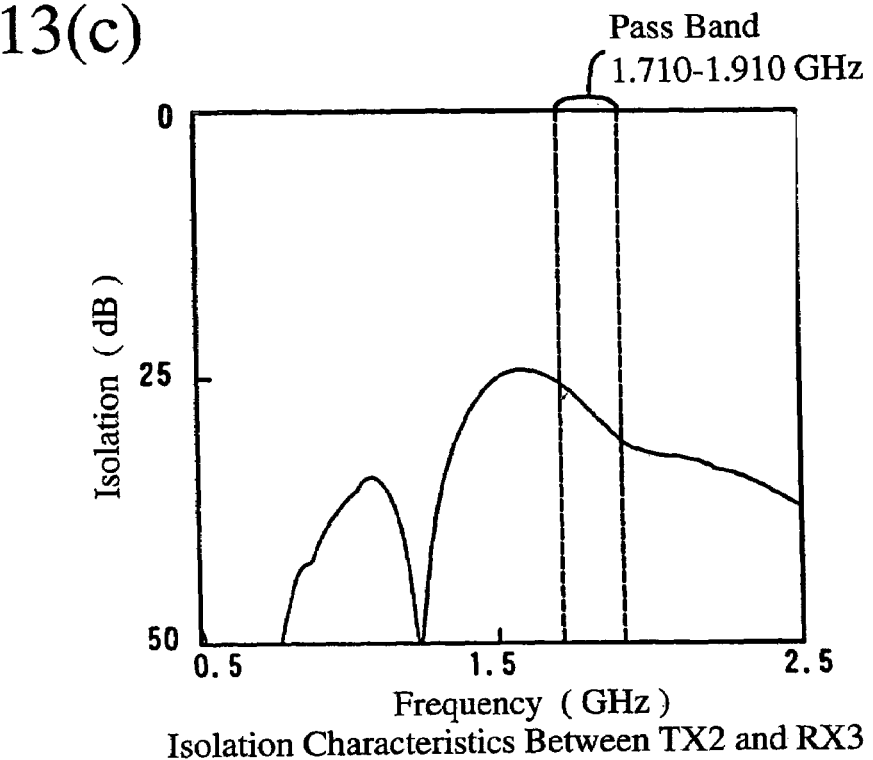
FIG. 13(c) is a reference graph showing the characteristics of isolation between TX2 and RX3 in a DCS/PCS TX mode in the high-frequency switch module in REFERENCE EXAMPLE 1.
Figure 14A:
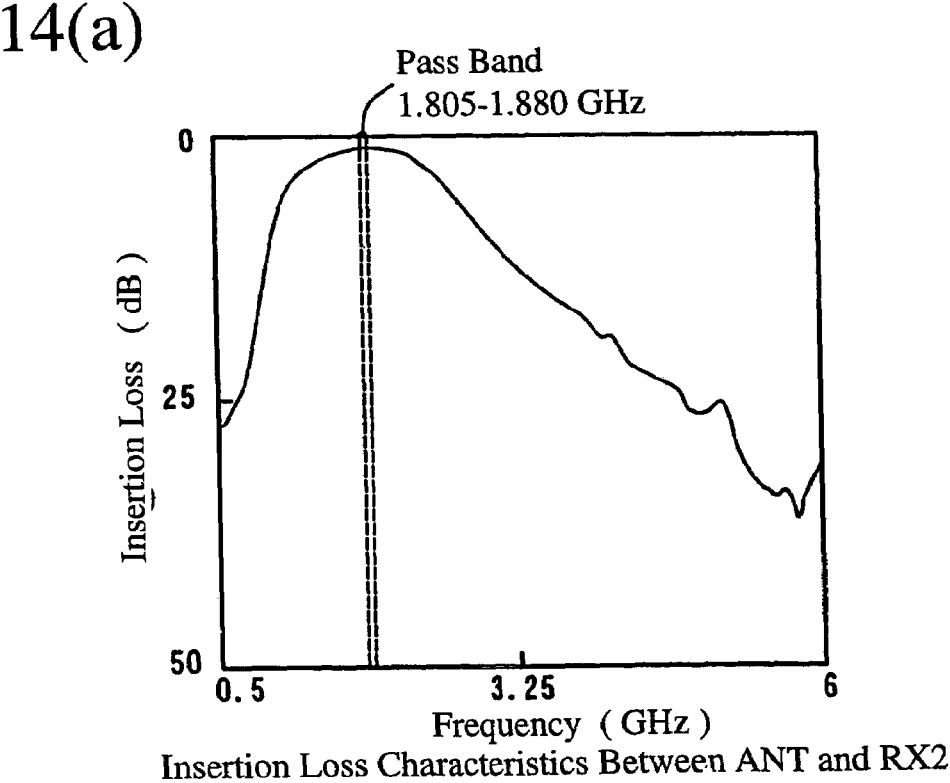
FIG. 14(a) is a reference graph showing the characteristics of insertion loss between ANT and RX2 in a DCS RX mode in the high-frequency switch module in REFERENCE EXAMPLE 1.
Figure 14B:
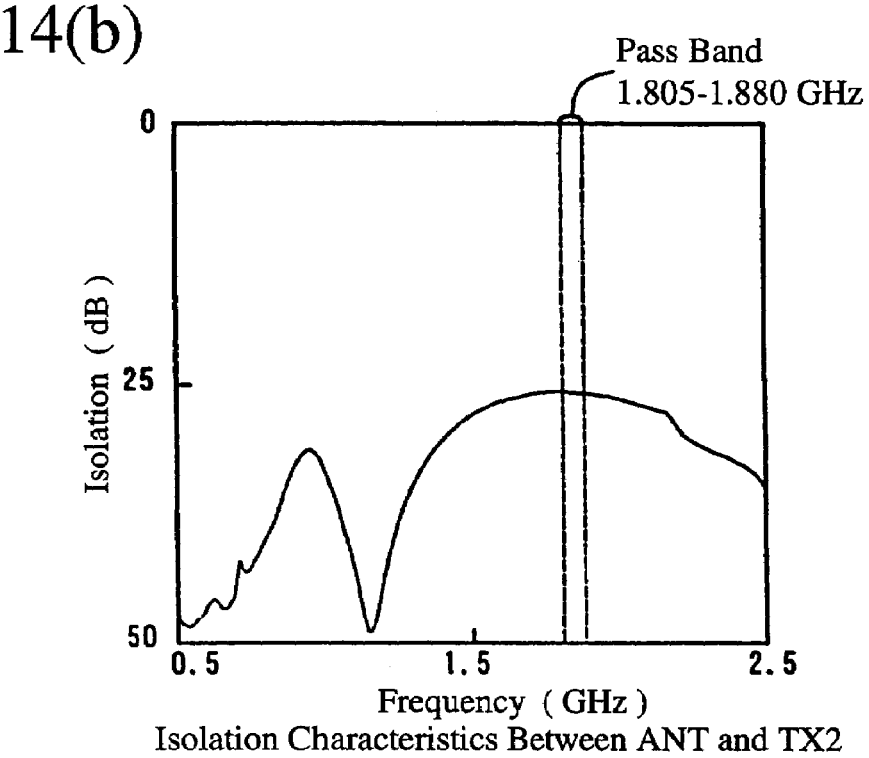
FIG. 14(b) is a reference graph showing the characteristics of isolation between ANT and TX2 in a DCS RX mode in the high-frequency switch module in REFERENCE EXAMPLE 1.
Figure 14C:
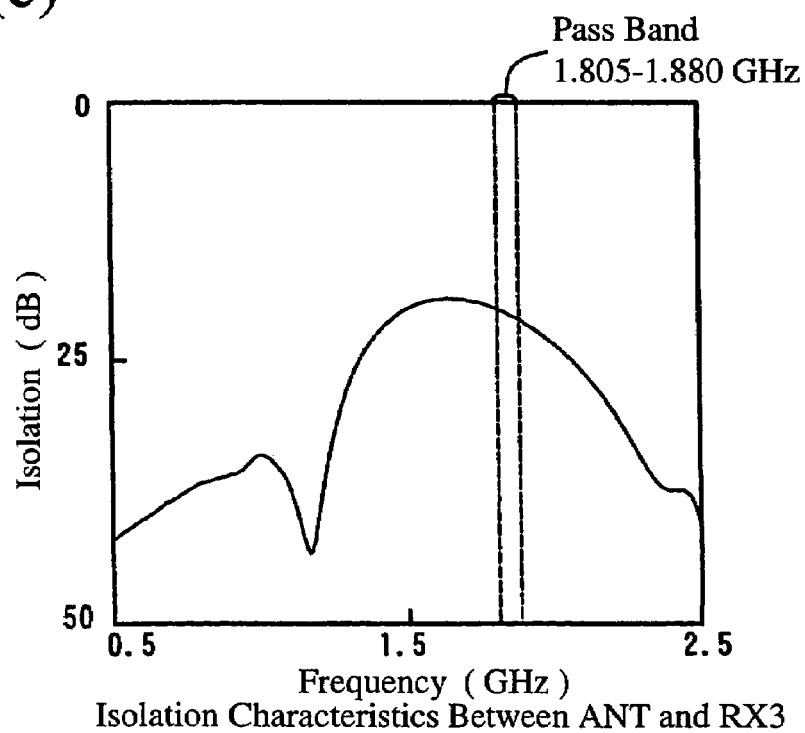
FIG. 14(c) is a reference graph showing the characteristics of isolation between ANT and RX3 in a DCS RX mode in the high-frequency switch module in REFERENCE EXAMPLE 1.
Figure 15A:
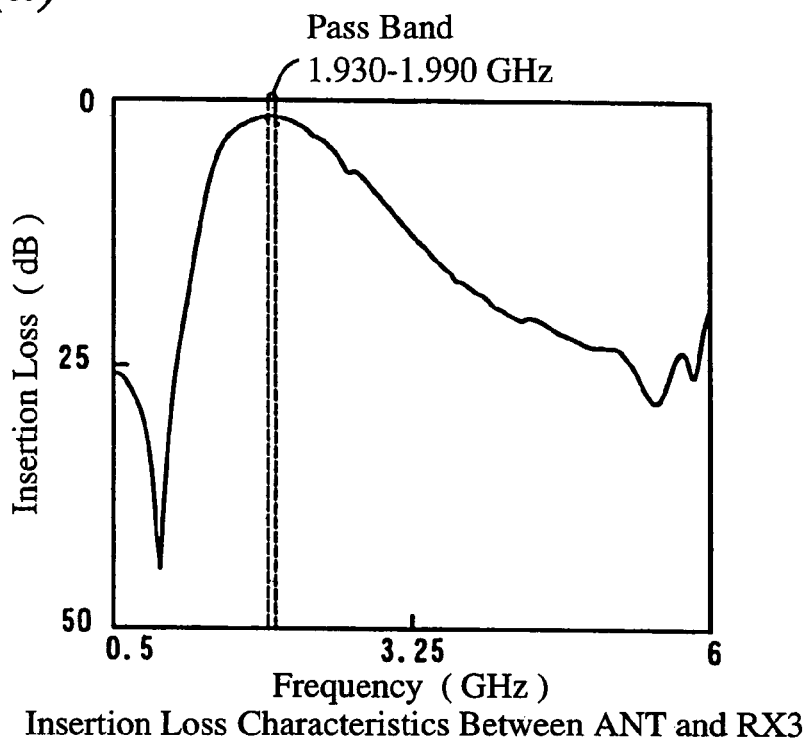
FIG. 15(a) is a reference graph showing the characteristics of insertion loss between ANT and RX3 in a PCS RX mode in the high-frequency switch module in REFERENCE EXAMPLE 1.
Figure 15B:
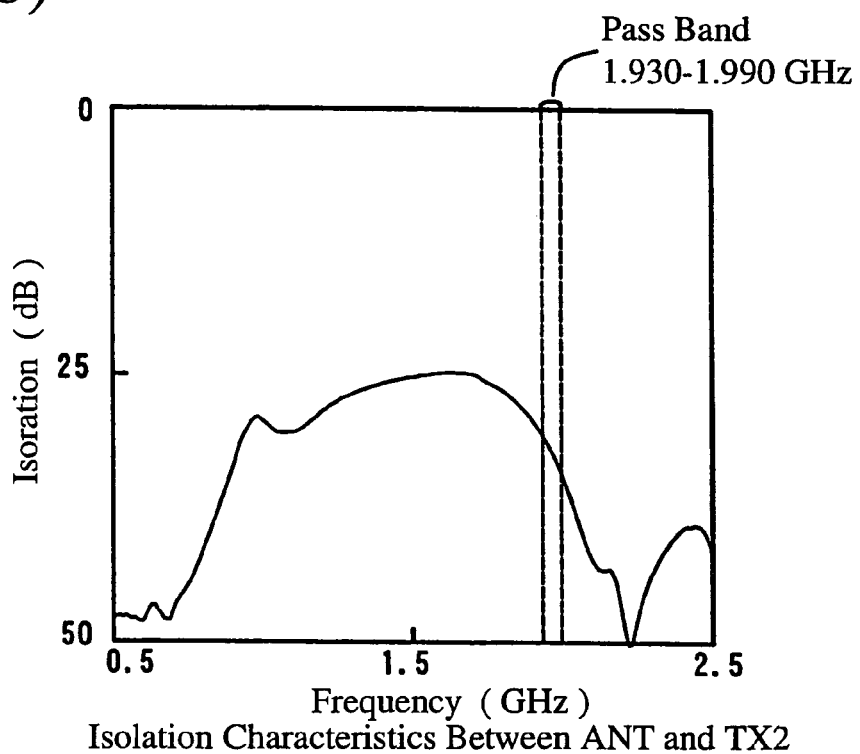
FIG. 15(b) is a reference graph showing the characteristics of isolation between ANT and TX2 in a PCS RX mode in the high-frequency switch module in REFERENCE EXAMPLE 1.
Figure 15C:
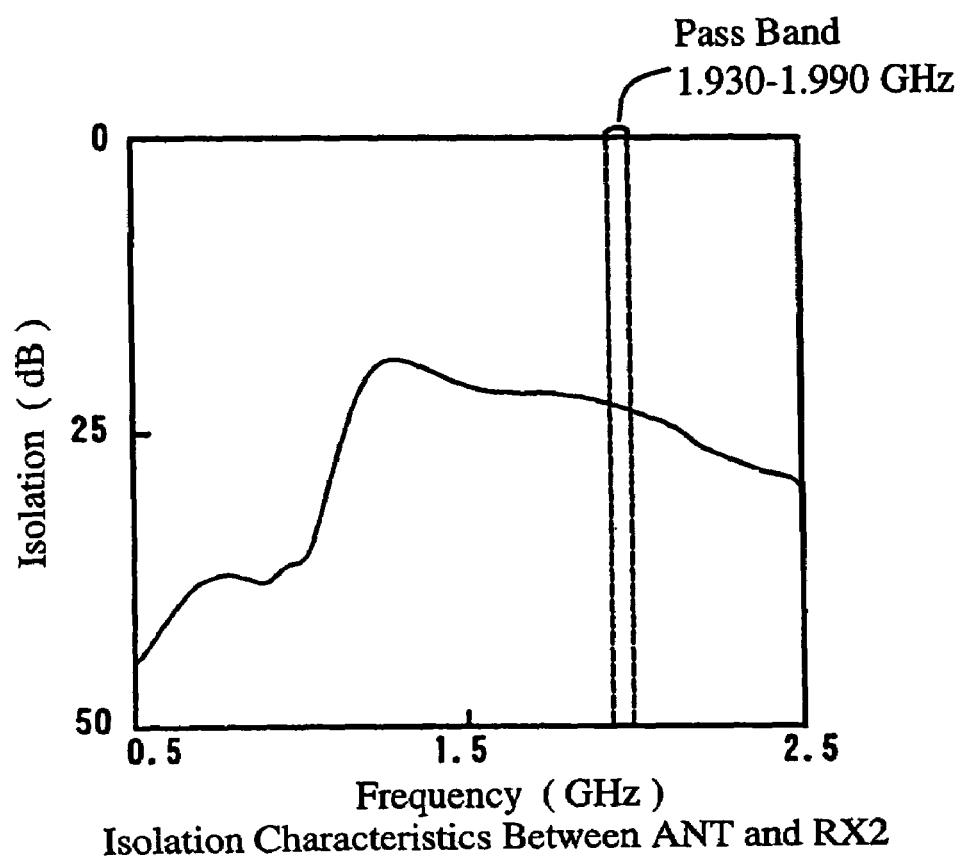
FIG. 15(c) is a reference graph showing the characteristics of isolation between ANT and RX2 in a PCS RX mode in the high-frequency switch module in REFERENCE EXAMPLE 1.

FIG. 10 shows an equivalent circuit of a high-frequency-switch module using a high-frequency switch circuit according to a further reference embodiment of the present invention. Because the high-frequency switch module in this REFERENCE EXAMPLE has many parts common with REFERENCE EXAMPLE 1, explanation will be restricted here to only different parts. First and second switch circuits in the first to third transmitting and receiving system (GSM, DCS, PCS) are the same as in REFERENCE EXAMPLE 1 with respect to an equivalent circuit.

The first and second filter circuits F1, F2 connected to an antenna ANT is constituted by a distributed constant line and a capacitor as in REFERENCE EXAMPLE 1, and the equivalent circuit comprises a low-pass filter as a first filter circuit for passing transmission and reception signals for GSM while attenuating transmission and reception signals for DCS and PCS, and a high-pass filter as a second filter circuit for passing transmission and reception signals for DCS and PCS while attenuating transmission and reception signals for GSM. The low-pass filter comprises a distributed constant line LF5 between the antenna ANT and the first switch circuit SW1, and a series resonance circuit comprising a distributed constant line LF6 and a capacitor CF6 is connected between one end of the distributed constant line LF5 and a ground. On the other hand, the high-pass filter comprises a capacitor CF5 connected between the antenna ANT and the second switch circuit F2, and a series resonance circuit comprising a distributed constant line LF7 and a capacitor CF7, which is connected between CF5 and the ground.

The high-frequency switch module of this REFERENCE EXAMPLE can be used in three different communication modes, exhibiting the same effects as in REFERENCE EXAMPLE 1.

Though the high-frequency switch module using the high-frequency switch circuit of the present invention has been explained in detail referring to FIG. 9, it is not restricted thereto, and various modifications may be made unless deviating from the scope of the present invention. With respect to communication modes usable in the high-frequency switch module comprising the high-frequency switch circuit of the present invention, they are not restricted to combinations shown in EXAMPLE and REFERENCE EXAMPLES but switching can be carried out among three different transmitting and receiving systems, for instance, a combination of GPS (Global Positioning System), D-AMPS (Digital Advanced Mobile Service) and PCS, or a combination of GSM, WCDMA (Wide-Band Code Division Multiple Access) and PCS.

APPLICABILITY IN INDUSTRY

The high-frequency switch circuit of the present invention is capable of switching transmission circuits and reception circuits of a plurality of systems with a miniaturized size and high-performance, and accordingly, the high-frequency switch module comprising such a high-frequency switch can be used, for instance, for portable communications equipment such as triple-band cellular phones of a multi-communication system usable in three different communication modes, so that it can switch an antenna ANT, a transmission circuit TX1 and a reception circuit RX1 of the first transmitting and receiving system, a transmission circuit TX2 of the second and third transmitting and receiving systems, a reception circuit RX2 of the second transmitting and receiving system, and a reception circuit RX3 of the third transmitting and receiving system, with the transmission circuit of the second transmitting and receiving system and the transmission circuit of the third transmitting and receiving system being made common parts. Therefore, the high-frequency switch module comprising the high-frequency switch circuit of the present invention can be miniaturized while keeping excellent electric characteristics, with some parts such as amplifiers shared by the second and third transmitting and receiving systems. As a result, a portable communication equipment comprising the high-frequency switch circuit can be further miniaturized and reduced in weight.

The invention claimed is:

1. A high-frequency switch circuit for switching a connection between a common transmission circuit and an antenna side circuit in a plurality of transmitting and receiving systems, a connection between said antenna side circuit and a reception circuit in one of said plurality of transmitting and receiving systems, and a connection between said antenna side circuit and a reception circuit in the other of said plurality of transmitting and receiving systems, said high-frequency switch circuit comprises a first diode connected between said common transmission circuit and said antenna side circuit;

a first distributed constant line connected to said antenna side circuit;

a second diode connected to a ground at the other side of said first distributed constant line;

a capacitor connected in series to said first distributed constant line;

a third diode connected between said capacitor and said reception circuit in one of said plurality of transmitting and receiving systems;

a second distributed constant line connected between said capacitor and said reception circuit in the other of said plurality of transmitting and receiving systems; and a fourth diode connected to a ground at said reception circuit of said second distributed constant line, wherein said first distributed constant line is connected to the anode side of said first diode and the cathode side of said second diode, an a first control circuit is connected to the anode side of said second diode.

2. The high-frequency switch circuit according to claim 1, wherein said second distributed constant line is connected to the anode side of said third diode and the cathode side of said fourth diode, and a second control circuit is connected to the anode side of said fourth diode.

3. The high-frequency switch circuit according to claim 1, wherein said first distributed constant line is connected to the anode side of said first diode and the cathode side of said second diode, said second distributed constant line is connected to the anode side of said third diode and the cathode side of said fourth diode, a first control circuit is connected to the anode side of said second diode, and a second control circuit is connected to the anode side of said fourth diode, wherein the connection between a common transmission circuit and an antenna side circuit is carried out by making said first and second diodes in an ON-state by applying voltage from a power supply of said first control circuit; the connection between said antenna side circuit and said reception circuit in said one of said plurality of transmitting and receiving systems is carried out by making said first and second diodes in an OFF-state and, and making said third and fourth diodes in an ON-state by applying voltage from a power supply of said second control circuit; and the connection between said antenna side circuit and said reception circuit in the other of said plurality of transmitting and receiving systems is carried out by making said first to fourth diodes in an OFF-state, respectively.

4. The high-frequency switch circuit according to claim 1, wherein said first and second distributed constant lines are constituted by line electrodes in a laminate comprising dielectric layers having electrode patterns, and said first to fourth diodes are mounted onto said laminate.

5. A wireless phone comprising a high-frequency switch circuit according to claim 1, being disposed between an antenna and transmission circuit and reception circuits.

* * * * *

UNITED STATES PATENT AND TRADEMARK OFFICE
CERTIFICATE OF CORRECTION

PATENT NO. : 7,171,234 B2
APPLICATION NO. : 11/090640
DATED : January 30, 2007
INVENTOR(S) : Shigeru Kemmochi et al.

Page 1 of 1

It is certified that error appears in the above-identified patent and that said Letters Patent is hereby corrected as shown below:

On the Title Page, Item (73), lines 1-3,
"Assignees: Marino-Forum21, Tokyo (JP); Tokyo Kyuei Co., Ltd., Tokyo (JP); Hitachi Metals, Ltd., Tokyo (JP)" should read Item [73] --Assignee: Hitachi Metals, Ltd., Tokyo (JP)--.

In claim 1, column 16, line 1, "diode, an a" should read --diode, and a--.

In claim 3, column 16, line 24, "OFF-state and, and making" should read --OFF-state, and making--.

Signed and Sealed this

Twenty-ninth Day of May, 2007

JON W. DUDAS
*Director of the United States Patent and Trademark Office*